United States Patent
Min et al.

(10) Patent No.: US 8,611,904 B2
(45) Date of Patent: Dec. 17, 2013

(54) APPARATUS AND METHOD FOR PROVIDING HANDOVER SUPPORT INFORMATION IN MOBILE COMMUNICATION SYSTEM

(75) Inventors: Chan-Ho Min, Seoul (KR); Jung-Soo Jung, Seongnam-si (KR); Dong-Wook Kim, Suwon-si (KR); Kyeong-In Jeong, Hwaseong-si (KR); Jong-Hyung Kwun, Seoul (KR); Chae-Gwon Lim, Seoul (KR); Young-Hyun Jeon, Guri-si (KR)

(73) Assignee: Saumsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 13/095,238

(22) Filed: Apr. 27, 2011

(65) Prior Publication Data

US 2011/0263262 A1  Oct. 27, 2011

(30) Foreign Application Priority Data

Apr. 27, 2010  (KR) .......................... 10-2010-0038886

(51) Int. Cl.
*H04W 36/00* (2009.01)
*H04W 4/00* (2009.01)
*H04B 17/00* (2006.01)

(52) U.S. Cl.
USPC .................. 455/437; 455/67.11; 370/331

(58) Field of Classification Search
USPC ........ 455/436, 437, 438, 441, 67.11; 370/331
See application file for complete search history.

(56) References Cited

U.S. PATENT DOCUMENTS

| | | | |
|---|---|---|---|
| 2006/0199591 A1* | 9/2006 | Klatt | 455/450 |
| 2007/0129017 A1* | 6/2007 | Dalsgaard et al. | 455/67.11 |
| 2007/0249351 A1 | 10/2007 | An et al. | |
| 2008/0049674 A1 | 2/2008 | Cha et al. | |
| 2008/0311910 A1* | 12/2008 | Ishii et al. | 455/436 |
| 2009/0143093 A1* | 6/2009 | Somasundaram et al. | 455/525 |
| 2010/0056158 A1* | 3/2010 | Du | 455/438 |
| 2010/0120429 A1* | 5/2010 | Kazmi et al. | 455/436 |
| 2010/0214943 A1* | 8/2010 | Immendorf et al. | 370/252 |
| 2010/0273487 A1* | 10/2010 | Alonso-Rubio et al. | 455/436 |
| 2010/0298001 A1* | 11/2010 | Dimou et al. | 455/441 |
| 2011/0028144 A1* | 2/2011 | Catovic et al. | 455/423 |
| 2011/0098042 A1* | 4/2011 | Mach et al. | 455/435.1 |
| 2011/0250891 A1* | 10/2011 | Zou et al. | 455/437 |
| 2012/0108252 A1* | 5/2012 | Dimou et al. | 455/450 |

FOREIGN PATENT DOCUMENTS

| | | |
|---|---|---|
| JP | 2006-86615 A | 3/2006 |
| JP | 2008-502269 A | 1/2008 |
| JP | 2009-147954 A | 7/2009 |
| JP | 2009-284251 A | 12/2009 |
| JP | 2010-45452 A | 2/2010 |
| JP | 2010-521119 A | 6/2010 |
| KR | 10-2004-0081545 A | 9/2004 |
| WO | 2009/088044 A1 | 7/2009 |
| WO | 2010/002926 A1 | 1/2010 |

* cited by examiner

*Primary Examiner* — Christopher M Brandt
(74) *Attorney, Agent, or Firm* — Jefferson IP Law, LLP

(57) ABSTRACT

An apparatus and method for providing handover support information in a mobile communication system are provided. A method for an Base Station (BS) to provide information necessary for measurement report trigger performance to a Mobile Station (MS) after the MS determines neighboring BSs in a mobile communication system includes, in a case where the MS is an active mode MS, providing a Time To Trigger (TTT) independently by a specific neighboring BS to the active mode MS and, in a case where the MS is an idle mode MS, providing a reselection time period (Treselection) independently by the specific neighboring BS to the idle mode MS.

16 Claims, 13 Drawing Sheets

APPARATUS AND METHOD FOR PROVIDING HANDOVER SUPPORT INFORMATION IN MOBILE COMMUNICATION SYSTEM

PRIORITY

This application claims the benefit under 35 U.S.C. §119(a) of a Korean patent application filed in the Korean Intellectual Property Office on Apr. 27, 2010 and assigned Serial No. 10-2010-0038886, the entire disclosure of which is hereby incorporated by reference.

BACKGROUND OF THE INVENTION

1. Field of the Invention

The present invention relates to an apparatus and method for providing a Time To Trigger (TTT) for handover of a User Equipment (UE). More particularly, the present invention relates to an apparatus and method for providing a Time To Trigger for handover of a User Equipment and a time period (Treselection) for cell reselection of the UE in a mobile communication system.

2. Description of the Related Art

Recently, a demand for high-speed data services has been continuously increasing in mobile communication systems. The data services are provided mainly in a specific small area at the coverage side, so attention is increasingly being paid to a micro cell (or a pico cell, a hot zone, a femto cell, and the like).

The characteristics of a micro cell are given as follows. The micro cell has a smaller coverage than a macro cell, and may overlap with the macro cell. Also, the micro cell can operate in the same or different frequency from the macro cell, and makes use of a low transmit power compared to a macro evolved Node B (eNB).

However, in a case where a UE performs handover from a macro cell to a micro cell, there is a problem that the use of an existing setting value for handover as used between macro cells results in high handover failure probability.

Therefore, a need exists for an apparatus and method for providing handover support information in a mobile communication system.

SUMMARY OF THE INVENTION

Aspects of the present invention are to address at least the above-mentioned problems and/or disadvantages and to provide at least the advantages below. Accordingly, an aspect of the present invention is to provide an apparatus and method for providing HandOver (HO) support information in a mobile communication system.

Another aspect of the present invention is to provide an apparatus and method for providing a Time To Trigger (TTT) for handover of a Mobile Station (MS) in a mobile communication system.

A further aspect of the present invention is to provide an apparatus and method for providing a time period (Treselection) for cell reselection of a MS in a mobile communication system.

Yet another aspect of the present invention is to provide an apparatus and method for, in order to support a stable handover success at handover performance between macro and micro cells, negotiating TTT related information between Base Stations (BSs) in a 3rd Generation Partnership Project Long Term Evolution (3GPP LTE) based system.

Still another aspect of the present invention is to provide an apparatus and method for a serving BS to forward a TTT value independently by a specific neighboring BS to an active mode MS for the sake of stable handover performance between macro and micro cells in a 3GPP LTE system.

Still another aspect of the present invention is to provide an apparatus and method for a serving BS to forward a Treselection value independently by a specific neighboring BS to an idle mode MS for the sake of stable cell reselection performance between macro and micro cells in a 3GPP LTE system.

The above aspects are achieved by providing an apparatus and method for providing handover support information in a mobile communication system.

According to an aspect of the present invention, a method for an BS to provide information necessary for measurement report trigger performance to a MS, after the MS measures neighboring BSs in a mobile communication system, is provided. The method includes, in a case where the MS is an active mode MS, providing a TTT independently by specific neighboring BS to the active mode MS and, in a case where the MS is an idle mode MS, providing a reselection time period Treselection independently by a specific neighboring BS to the idle mode MS.

According to another aspect of the present invention, a method for an BS to transmit handover information of a MS to another BS in a mobile communication system is provided. The method includes performing negotiation by sending a mobility change message including mobility change information to a neighboring BS, and receiving a response message to the mobility change message.

According to a further aspect of the present invention, a method for acquiring mobility information of a neighboring BS in a MS of a mobile communication system is provided. The method includes, in a case where the MS is in an active mode, receiving the mobility information of the BS through a control message, determining if a measurement report condition is met, based on the mobility information included in the control message, in a case where the measurement report condition is met, transmitting a measurement report message to the BS, in a case where the MS is in an idle mode, receiving the mobility information of the BS through a System Information Block (SIB), determining if a cell reselection condition is met, based on the mobility information included in the SIB, and, in a case where the cell reselection condition is met, performing cell reselection.

According to yet another aspect of the present invention, an apparatus of an BS providing information of a neighboring BS to a MS in a mobile communication system is provided. The apparatus includes a controller and a transmitter. In a case where the MS is an active mode MS, the controller generates a TTT independently by a specific neighboring BS. In a case where the MS is an idle mode MS, the controller generates a Treselection independently by a specific neighboring BS. The transmitter transmits the generated TTT to the active mode MS and transmits the generated Treselection to the idle mode MS.

According to still another aspect of the present invention, an apparatus of an BS for transmitting handover information of a MS to another BS in a mobile communication system is provided. The apparatus includes a controller, a transmitter, and a receiver. The controller generates a mobility change message including mobility change information. The transmitter transmits the mobility change message to a neighboring BS. The receiver receives a response message to the mobility change message.

According to still another aspect of the present invention, an apparatus of a MS for acquiring mobility information of a neighboring BS in a mobile communication system is provided. The apparatus includes a controller and a receiver. In a case where the MS is in an active mode, the controller acquires the mobility information of the BS through a control message, determines if a measurement report condition is met based on the mobility information included in the control message and, in a case where the measurement report condition is met, transmits a measurement report message to the BS. In a case where the MS is in an idle mode, the controller acquires the mobility information of the BS through a SIB, determines if a cell reselection condition is met based on the mobility information included in the SIB, and, in a case where the cell reselection condition is met, performs cell reselection. The receiver receives the control message and the SIB.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features, and advantages of certain exemplary embodiments of the present invention will become more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and method for providing HandOver (HO) support information in a mobile communication system.

The $3^{rd}$ Generation Partnership Project Radio Access Network WorkingGroup 1 (3GPP RAN WG1) is considering a heterogeneous network as a Long Term Evolution (LTE)—Advanced study item from 2009 October conference. The Heterogeneous Network (HetNet) means a cellular deployment of a form in which micro evolved Node Bs (eNBs) using lower transmission outputs are overlaid with each other within an area of a macro eNB.

That is, in the HetNet, cells of different sizes are mixed or overlaid with each other. Here, all eNBs use the same wireless transmission technology.

Figure 1:
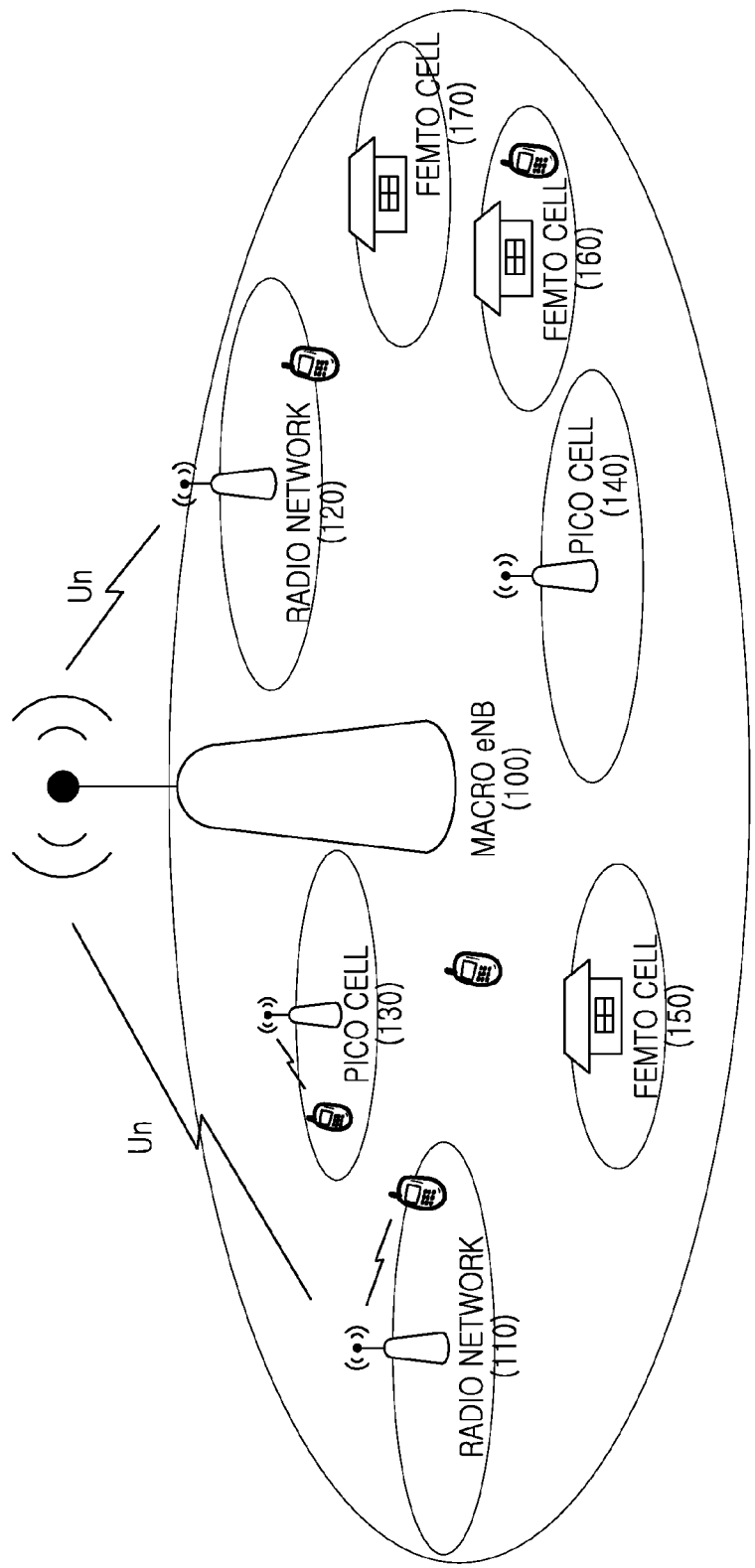
FIG. 1 is a diagram illustrating an example of a heterogeneous network according to an exemplary embodiment of the present invention.

FIG. 1 is a diagram illustrating an example of a heterogeneous network according to an exemplary embodiment of the present invention.

Referring to FIG. 1, within an area managed by a macro eNB 100 of the heterogeneous network, there are pico cells 130 and 140 and femto cells 150, 160, and 170, and there are micro cells with radio networks 110 and 120 of a small scale.

In exemplary embodiments of the present invention, a description is made considering a 3$^{rd}$ Generation Partnership Project Long Term Evolution (3GPP LTE) based system.

An exemplary embodiment of the present invention relates to a method for, when a User Equipment (UE) performs handover between macro and micro cells, efficiently supporting the handover at heterogeneous network deployment.

More particularly, an exemplary embodiment of the present invention describes a way for negotiating Time To Trigger (TTT) related information between eNBs in the 3GPP LTE based system.

Also, an exemplary embodiment of the present invention relates to a method for an idle mode UE to efficiently support cell reselection triggering, when the idle mode UE performs cell reselection between macro and micro cells.

An exemplary embodiment of the present invention describes a way for a serving eNB to forward TTT and reselection time period (Treselection) values independently by a neighboring eNB to a UE in the 3GPP LTE based system.

An active mode UE compares two received signal strengths with each other after measuring Reference Signal Received Power (RSRP) of a serving eNB and a target eNB. After that, the active mode UE sends a measurement report message to the serving eNB if a measurement trigger condition is met.

In an LTE system, there are several kinds of measurement trigger conditions, but the most widely used measurement trigger condition (Event A3) among them is given in Formula 1 below.

$$\text{Entering condition: } Mn+Ofn+Ocn-Hys>Ms+Ofs+Ocs+Off$$

$$\text{Leaving condition: } Mn+Ofn+Ocn+Hys<Ms+Ofs+Ocs+Off \quad (1)$$

where,

Ms: RSRP (Signal to Interference+Noise Ratio (SINR)) measurement value of a serving cell (decibel (dB));

Mn: RSRP (SINR) measurement value of a neighbor cell (dB);

Ofs: offset considering carrier frequency of the serving cell (dB);

Ofn: offset considering carrier frequency of the neighbor cell (dB);

Ocs: offset used for signal level control of the serving cell at handover performance (dB);

Ocn: offset used for signal level control of the neighbor cell at handover performance (dB); and Off: offset for reflecting feature of Event A3 (dB).

An Event A3 takes place if a leaving condition is not met during a TTT time after a UE meets an entering condition. Here, the TTT value means a time to meet the measurement trigger condition in order to trigger a measurement event. The LTE system can select and apply one of sixteen TTT values according to a speed of a UE.

The 'Ocn' value, which is an offset value added to or subtracted from a neighboring cell signal level at handover performance, can be differently set every specific two cells. The 'Ocs' value, which is an offset value added or subtracted from a serving cell signal level at handover performance, is a parameter existing every specific cell.

If receiving a measurement report from a UE, a serving eNB determines handover or non-handover of the UE with reference to Radio Resource Management (RRM) information.

Figure 2:
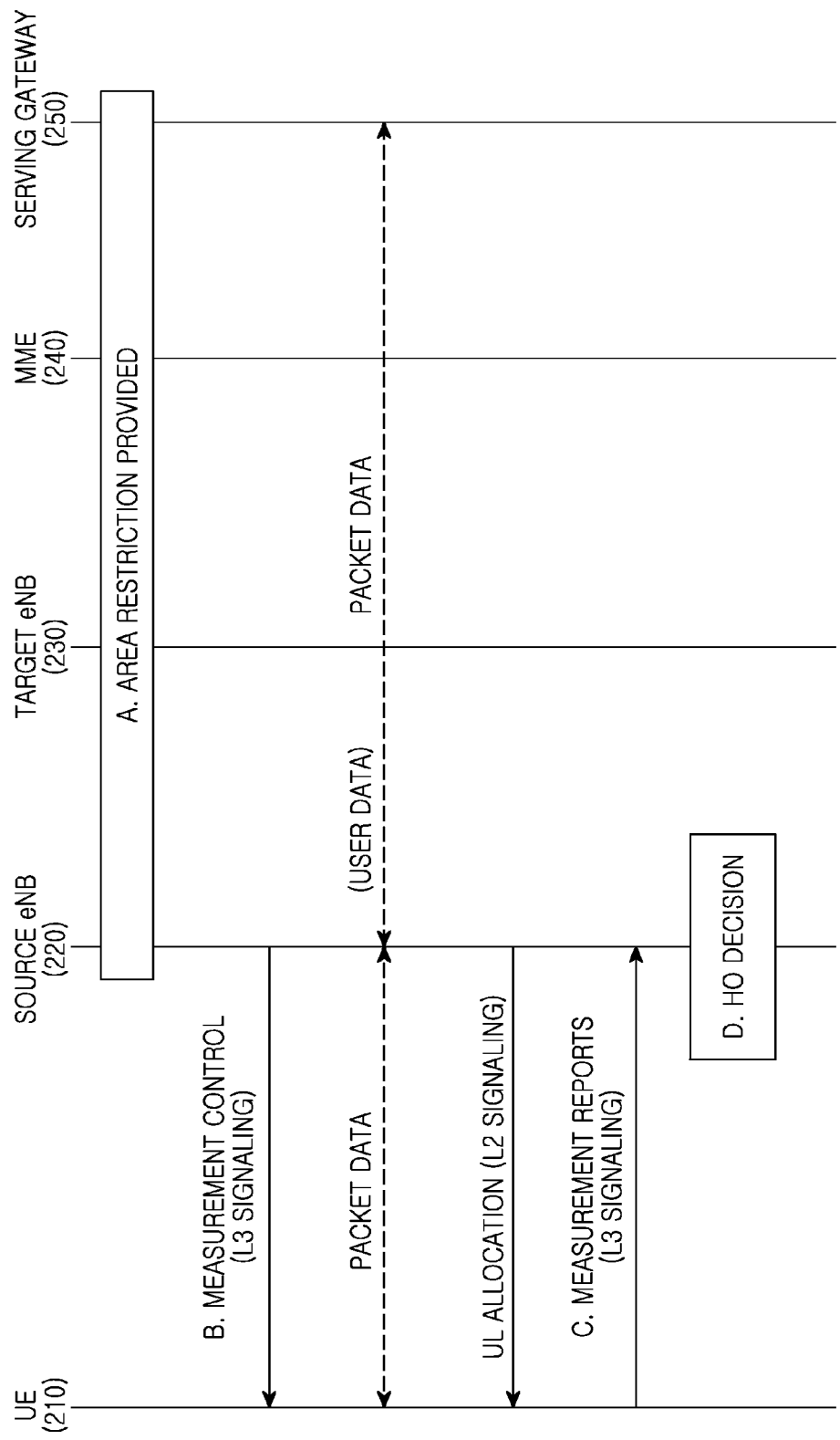
FIG. 2 is a message flow illustrating a process of sending a measurement report message according to an exemplary embodiment of the present invention.

FIG. 2 is a message flow illustrating a process of sending a measurement report message according to an exemplary embodiment of the present invention.

Referring to FIG. 2, in an LTE system, there are several kinds of measurement report triggering conditions. Among them, the most widely used measurement report triggering condition is an Event A3 described above.

A Mobility Management Entity (MME) 240 or a serving gateway 250 has area restriction information at step A.

A source eNB 220 sends a measurement control message to a UE 210 to provide several values necessary for measurement report triggering performance to the UE 210 at step B.

One of the provided values is a TTT value. The measurement control message means an RRC connection reconfiguration message, including a MeasConfig Information Element (IE) in the LTE system.

An Event A3 takes place if a leaving condition is not met during a TTT time after an entering condition of the Event A3 is met. Here, the TTT value means a time having to meet the measurement report triggering condition (i.e., the Event A3) in order to trigger a measurement report event. The TTT value is described below in more detail.

First, if the entering condition is met, the UE 210 operates a TTT related timer. After that, if the UE 210 continues to meet the entering condition during the TTT time, the UE 210 sends a measurement report message to the serving or source eNB 220 at step C.

If the entering condition is not met within the TTT time, the TTT related timer is reset to a first TTT value. If the leaving condition is met, the TTT related timer is released.

If the source eNB 220 receives the measurement report message from the UE 210, the source eNB 220 determines whether to allow the UE 210 to perform handover to a target eNB 230 with reference to RRM information at step D.

Henceforth, a process in which an idle mode UE performs cell reselection triggering is described below.

In a case where a UE operates in an idle mode, the idle mode UE performs measurement for the sake of cell reselection. Generally, the idle mode UE determines cell reselection performance or non-performance. Measurement rules for cell reselection triggering performance in the LTE system are given as follows.

If 'SServingCell' is less than 'Sintrasearch' or if the 'Sintrasearch' is not forwarded to a serving cell, the idle mode UE performs intra-frequency measurements. If the 'Sintrasearch' is forwarded to the serving cell and the 'SServingCell' is greater than the 'Sintrasearch', the UE is no longer required to perform intra-frequency measurements.

Here, the 'SServingCell' represents a received signal level value (unit is dB) of the serving cell, and the 'Sintrasearch' represents a threshold value (unit is dB) for intra-frequency measurements. A Treselection value for an idle mode UE performs a role similar to a TTT value for an active mode UE.

The Treselection value is described below in more detail. First, if a cell reselection triggering condition is met, a UE operates a Treselection related timer.

After that, if the cell reselection triggering condition continues to be met during a Treselection time, the UE performs a cell reselection process. If the cell reselection triggering condition is not met within the Treselection time, the Treselection related timer is reset to a first Treselection value.

Figure 3:
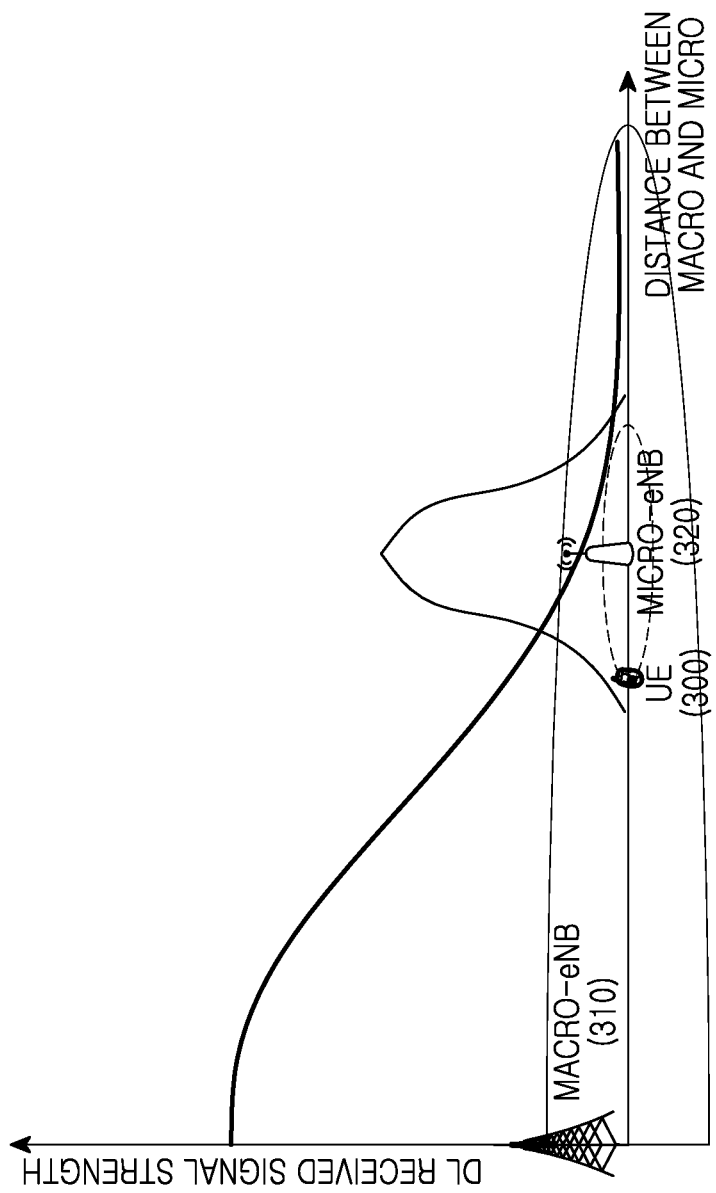
FIG. 3 is a diagram illustrating a change of DownLink (DL) received signal strength at handover from a macro cell to a micro cell according to an exemplary embodiment of the present invention.

FIG. 3 is a diagram illustrating a change of DownLink (DL) received signal strength at a handover from a macro cell to a micro cell according to an exemplary embodiment of the present invention.

Referring to FIG. 3, in a case where a macro cell 310 and a micro cell 320 operate in the same frequency under an environment in which the micro cell 320 is overlapped within the macro cell 310, when a UE 300 performs handover from the macro cell 310 to the micro cell 320, interference from a micro eNB of the micro cell 320 quickly increases near a micro cell 320 boundary, and a channel environment suddenly deteriorates.

Also, the UE 300 exerts significant UpLink (UL) interference to the micro eNB of the micro cell 320. That is because a path loss between the micro eNB of the micro cell 320 and the UE 300 varies quickly compared to a path loss between a macro eNB of the macro cell 310 and the UE 300. So, the UE 300 suffers a Radio Link Failure (RLF) before performing handover to the micro cell 320.

More particularly, in a case where the UE 300 moving at high speed performs handover from the macro cell 310 to the micro cell 320, if a relatively long TTT parameter value applied to handover performance between the macro cells 310 is applied to the handover from the macro cell 310 to the micro cell 320 as it is, the handover from the macro cell 310 to the micro cell 320 is delayed and a probability of RLF occurrence increases suddenly.

In order to address this problem, there is a need to apply a separate parameter (i.e., a handover trigger threshold and a TTT) suitable to handover carried out between the macro cell 310 and the micro cell 320.

In order to support stable handover between the macro cell 310 and the micro cell 320, the following two items should be all met.

First, a serving eNB should be able to apply a handover trigger threshold value and a TTT value independently by a neighboring target eNB and forward these parameter values to a UE. That is, the serving eNB should be able to apply separate handover trigger threshold and TTT values by a Physical Cell Identifier (PCI) of a handover target eNB and forward these parameter values to the UE.

This means that the serving eNB can apply the handover trigger threshold value and TTT value differently depending on whether the target eNB is the macro eNB of the macro cell 310 or is the micro eNB of the micro cell 320, and forward these parameter values to the UE 300.

Second, the serving eNB should know whether it must apply which handover trigger threshold value and TTT value by neighboring target eNB. That can meet the first requirement. The current standard of the related art has not yet proposed a way for negotiating a TTT value between eNBs.

These problems are presented in FIGS. 4, 5, and 6, to be described below. Here, the handover trigger threshold value means an offset value in an Event A3.

Figure 4:
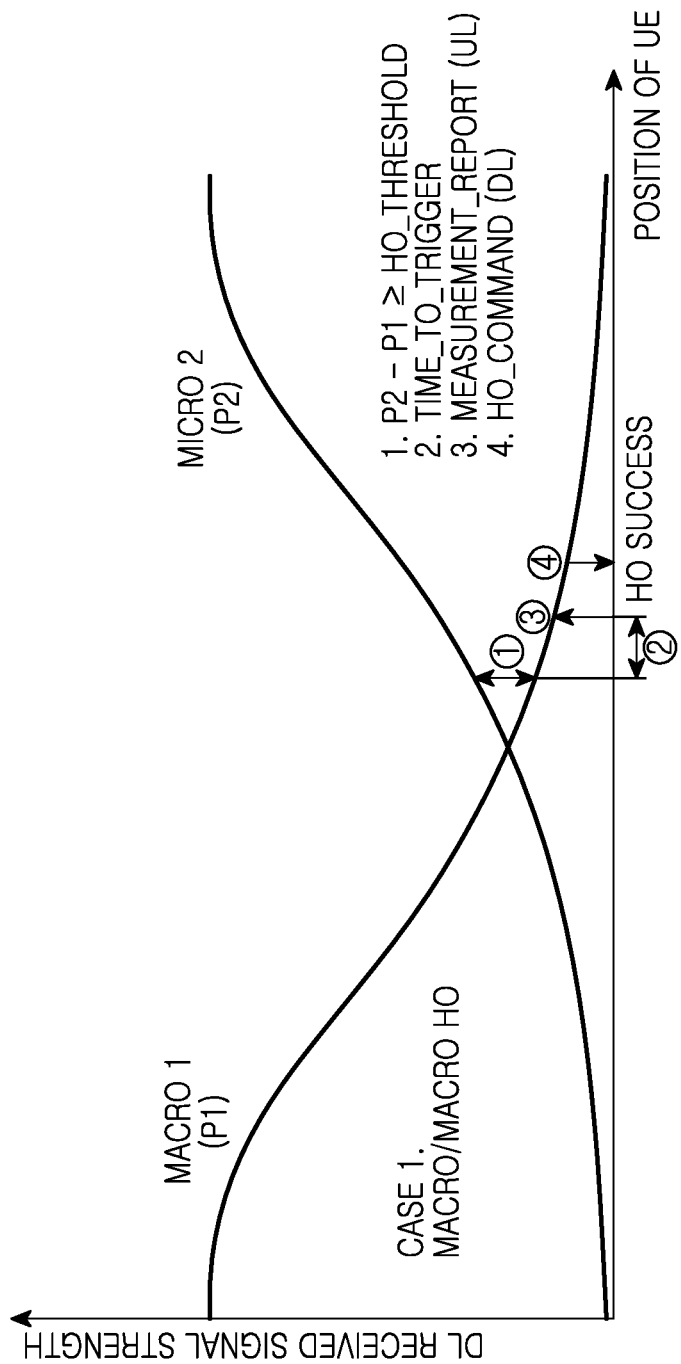
FIG. 4 is a diagram illustrating a HandOver (HO) process dependent on a position of a User Equipment (UE) when the UE performs handover from a macro cell to a macro cell according to an exemplary embodiment of the present invention.

FIG. 4 is a diagram illustrating an HO process dependent on a position of a UE when the UE performs handover from a macro cell to a macro cell according to an exemplary embodiment of the present invention.

Referring to FIG. 4, in a case where a UE performs handover from a macro cell 1 (P1) to a macro cell 2 (P2), an Event A3 occurs when an HO threshold value between the macro cells 1 and 2 is greater than an HO_threshold at step 1. When the Event A3 is maintained for more than a TTT value at step 2, the UE sends a measurement report message to the macro cell 1 at step 3. In response to this, the macro cell 1 determines handover or non-handover of the UE and sends an HO_command message to the UE at step 4.

Figure 5:
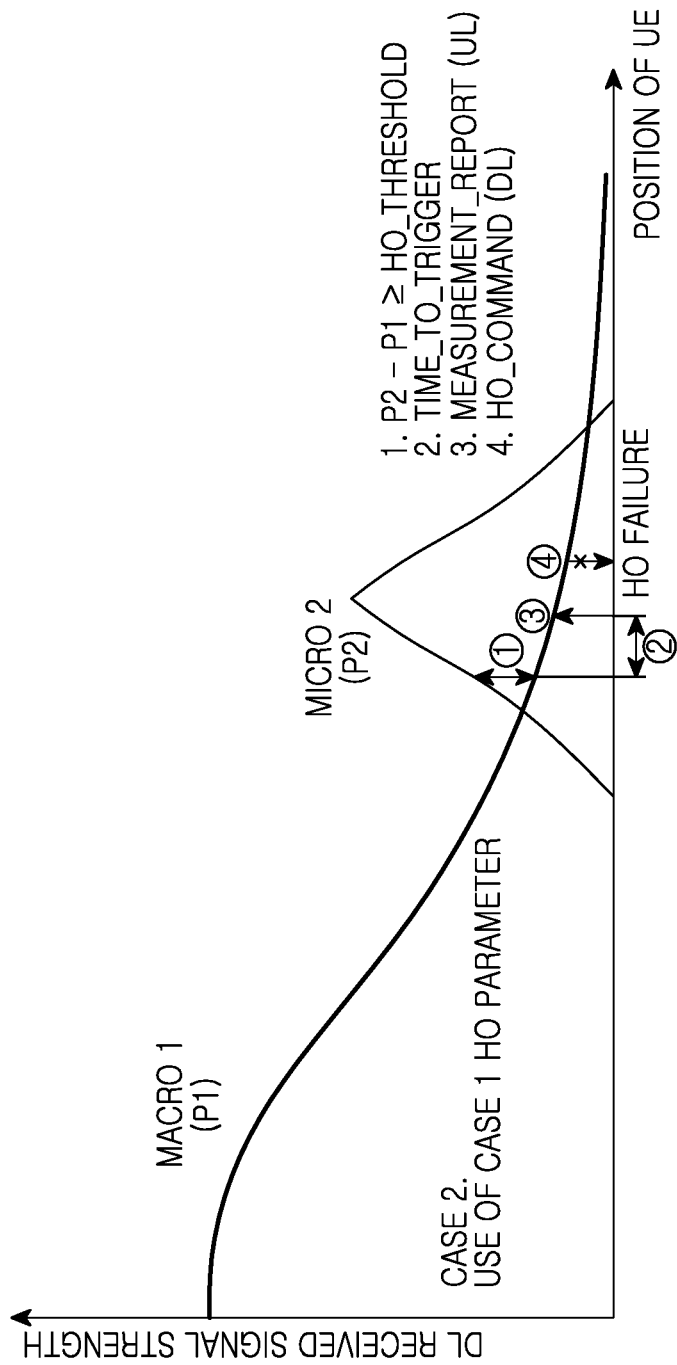
FIG. 5 is a diagram illustrating a handover process dependent on a position of a UE when the UE performs handover from a macro cell to a micro cell according to an exemplary embodiment of the present invention.

FIG. 5 is a diagram illustrating an HO process dependent on a position of a UE when the UE performs handover from a macro cell to a micro cell according to an exemplary embodiment of the present invention.

Referring to FIG. 5, steps 1-3 are the same as in FIG. 4. In a case where an HO process at steps 1 to 4 uses a parameter applied at handover from a macro cell to a macro cell as it is, an HO failure takes place owing to sudden interference at step 4.

Figure 6:
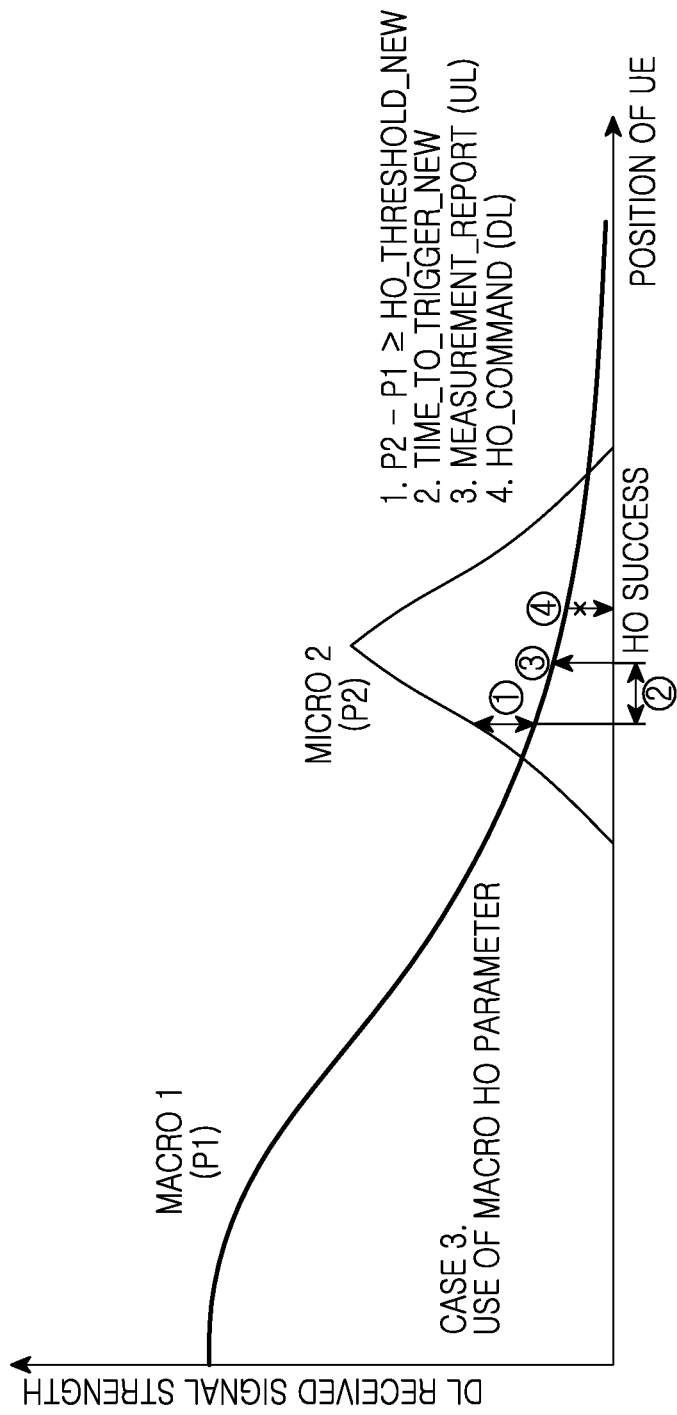
FIG. 6 is a diagram illustrating a handover process dependent on a position of a UE when the UE performs handover from a macro cell to a micro cell according to another exemplary embodiment of the present invention.

FIG. 6 is a diagram illustrating an HO process dependent on a position of a UE when the UE performs handover from a macro cell to a micro cell according to another exemplary embodiment of the present invention.

Referring to FIG. 6, an HO process at steps 1 to 4 applies a parameter optimized to handover from a macro cell 1 (P1) to a micro cell 2 (P2). As seen in FIG. 6, before sudden interference reception, the handover of a UE to the micro cell 2 (P2) is made quickly at steps 1 and 2, and thus an HO success at steps 3 and 4 is made.

As aforementioned, in order to support stable handover between a macro cell and a micro cell, a serving eNB should be able to apply a handover trigger threshold value and a TTT value independently by a neighboring eNB, and forward these parameter values to a UE.

That is, the serving eNB should be able to apply separate handover trigger threshold value and TTT value by PCI of an HO target eNB, and forward these parameter values to the UE. So, the serving eNB can make an HO success if the UE applies the handover trigger threshold value and TTT value differently depending on whether the HO target eNB is a macro eNB or a micro eNB, and sends a measurement report message to the serving eNB.

The handover trigger threshold value is presented as a 'cellIndividualoffset' value in a MeasObjectEUTRA IE. The MeasObjectEUTRA IE includes information necessary when an active mode UE determines neighboring cells.

However, in the current LTE standard, a serving eNB cannot forward a TTT value by a neighboring eNB to a UE. Like the TTT value, in the current LTE standard, the serving eNB cannot forward even a Treselection value independently by a neighboring eNB to the UE.

As described above, exemplary embodiments of the present invention provide an apparatus and method for negotiating TTT related information between eNBs through an X2 interface in a 3GPP LTE based system.

According to the LTE standard, a 'mobility settings procedure' is defined as one of elementary procedures. This procedure is a procedure in which, when desiring to change a mobility related parameter, an eNB negotiates the mobility related parameter to be changed with a neighboring eNB through the X2 interface.

Through the procedure, the current standard can perform a function of negotiating a change value of a handover trigger threshold for the purpose of load balancing between eNBs, HO optimization, and the like.

An exemplary embodiment of the present invention uses the 'mobility settings procedure' for TTT related information negotiation between eNBs through an X2 interface.

However, the present invention is not limited to using the X2 interface for the TTT related information negotiation and providing between eNBs. Any scheme for the TTT related information negotiation and providing between eNBs may be used.

Figure 7:
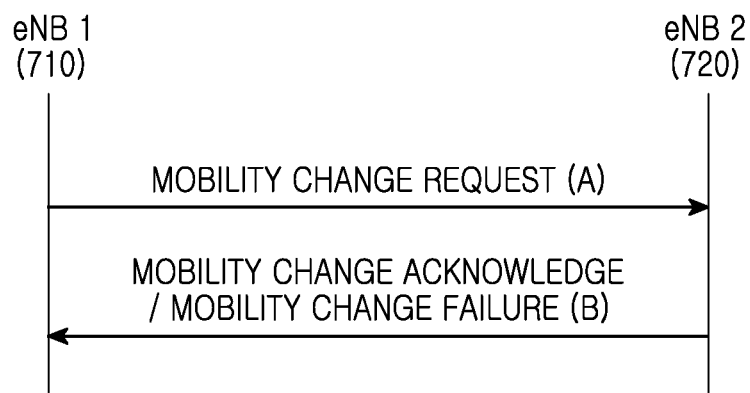
FIG. 7 is a ladder diagram illustrating a mobility change process of an evolved Node B (eNB) according to an exemplary embodiment of the present invention.

FIG. 7 is a ladder diagram illustrating a mobility change process of an eNB according to an exemplary embodiment of the present invention.

Referring to FIG. 7, to provide optimized TTT related information, an eNB1 710 sends a mobility change request message to an eNB2 720 connected through an X2 interface and a UE intending to perform handover from the eNB2 720 to the eNB1 710 at step A.

That is, the mobility change request message includes TTT related information optimized to its own cell. After the eNB2

720 receives the mobility change request message, the eNB2 720 determines whether the TTT related information included in the mobility change request message is an acceptable value.

If the eNB2 720 determines that the TTT related information is the acceptable value, the eNB2 720 forwards a mobility change acknowledge message as a response message to the eNB1 710 at step B. If the eNB2 720 does not accept the requested TTT related information, the eNB2 720 sends a mobility change failure message to the eNB1 710 at step B.

By the following two methods, the TTT related information can be added within the mobility change request message. The mobility change request message of the current LTE standard includes an IE called 'eNB2 Proposed Mobility Parameters'. This IE represents that the mobility change request message includes an IE called 'Mobility Parameters Information' that is mobility related parameter information to be used for handover that the eNB1 710 provides to the eNB2 720, and is shown in Table 1 below.

TABLE 1

| IE/Group Name | Presence | Range | IE type and Reference | Semantics description |
| --- | --- | --- | --- | --- |
| Handover Trigger Change | M | | INTEGER (−20 . . . 20) | The actual value is IE value * 0.5 dB |

Here, the 'Handover Trigger Change' means a change value for this threshold.

An exemplary embodiment of the present invention provides two ways for forwarding TTT related information.

First, a method for expressing TTT related information by a 'dB' value and negotiating the TTT related information is described below.

This method is a method for allowing an existing handover trigger change to express a TTT as well as a threshold. For this, an exemplary embodiment of the present invention proposes adding a handover trigger type IE to a mobility parameters information IE. So, the mobility parameters information IE reflecting this is shown in Table 2 below.

TABLE 2

| IE/Group Name | Presence | Range | IE type and Reference | Semantics description |
| --- | --- | --- | --- | --- |
| Handover Trigger Change | M | | INTEGER (−20 . . . 20) | The actual value is IE value * 0.5 dB |
| Handover Trigger Type | M | | ENUMERATED {Threshold, TimeToTrigger . . .} | |

For example, regarding the mobility parameters information IE corresponding to proposed mobility parameters of a mobility change request message, the eNB1 710 sets the handover trigger change to −3 dB and sets the handover trigger type to 'TimeToTrigger', and transmits the handover trigger change and the handover trigger type to the eNB2 720. If the eNB2 720 accepts this, the eNB2 720 reduces the TTT value for the eNB1 710 to 0.5 times of the current value.

The TTT value of the LTE standard is within a range of ms0, ms40, ms64, ms80, ms100, ms128, ms160, ms256, ms320, ms480, ms512, ms640, ms1024, ms1280, ms2560, and ms5120, and how to change the TTT value depending on the 'dB' value varies according to a realization scheme.

Second, a method for expressing TTT related information by an absolute value and negotiating the TTT related information is described below.

This method is a method for, regarding a handover trigger change, assuming that it is a change value for a threshold and, regarding a TTT, adding a new IE negotiate an absolute value. The IE is designated to one of TTT1 ms, TTT2 ms, . . . , TTTn ms. The mobility parameters information IE reflecting this is shown in Table 3 below.

TABLE 3

| IE/Group Name | Presence | Range | IE type and Reference | Semantics description |
| --- | --- | --- | --- | --- |
| Handover Trigger Change | 0 | | INTEGER (−20 . . . 20) | The actual value is IE value * 0.5 dB |
| Time To Trigger | 0 | | ENUMERATED {TTT1, TTT2, . . . TTTn} | Unit is ms. |

Figure 8:
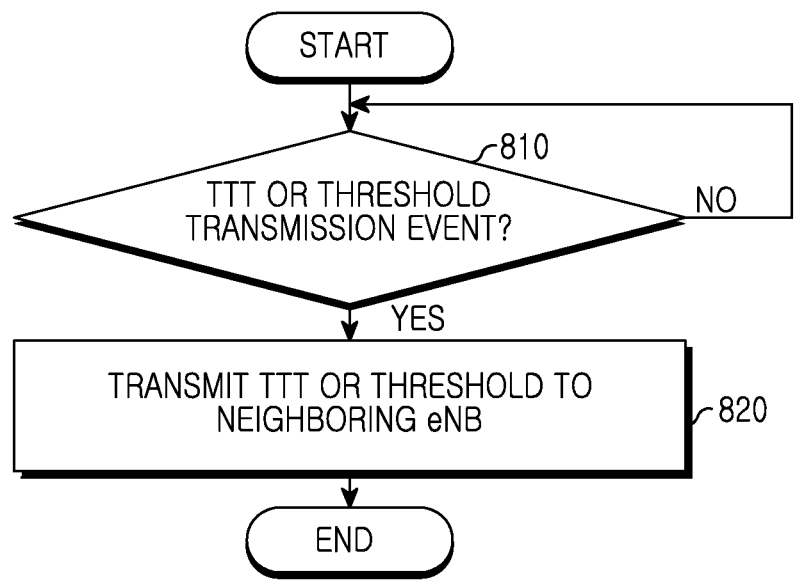
FIG. 8 is a flowchart illustrating a mobility change process of an eNB according to an exemplary embodiment of the present invention.

FIG. 8 is a flowchart illustrating a mobility change process of an eNB according to an exemplary embodiment of the present invention.

Referring to FIG. 8, when an event of transmitting a TTT or threshold (i.e., handover trigger threshold) value takes place at step 810, the eNB transmits the TTT or threshold (handover trigger threshold) value to a neighboring eNB (i.e., a corresponding eNB) at step 820.

Here, the transmitting event can be a case where the TTT or threshold (i.e., handover trigger threshold) value for the corresponding eNB is changed, a case where a new eNB is added and the new eNB transmits, and the like.

An exemplary embodiment of the present invention proposes a way for a serving eNB to forward TTT and Treselection values independently by a neighboring eNB to a UE in an LTE system.

Figure 9:
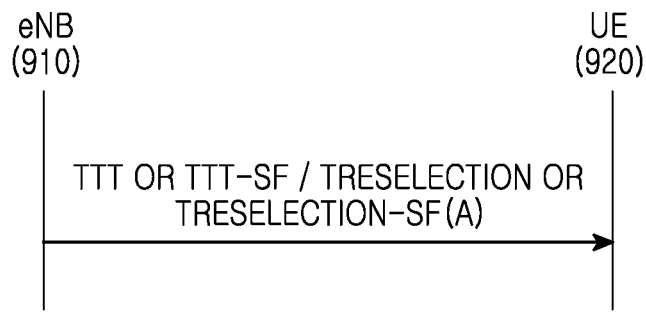
FIG. 9 is a message flow diagram illustrating a process of forwarding TTT and Treselection values independently by a neighboring eNB to a UE in a serving eNB according to an exemplary embodiment of the present invention.

FIG. 9 is a message flow diagram illustrating a process of forwarding TTT and Treselection values independently by a neighboring eNB to a UE in a serving eNB according to an exemplary embodiment of the present invention.

Referring to FIG. 9, the serving eNB 910 transmits a TTT or a TTT-Scaling Factor (SF)/a Treselection or a Treselection-SF to an active mode or idle mode UE 920 at step A. This is described below in detail.

Figure 10:
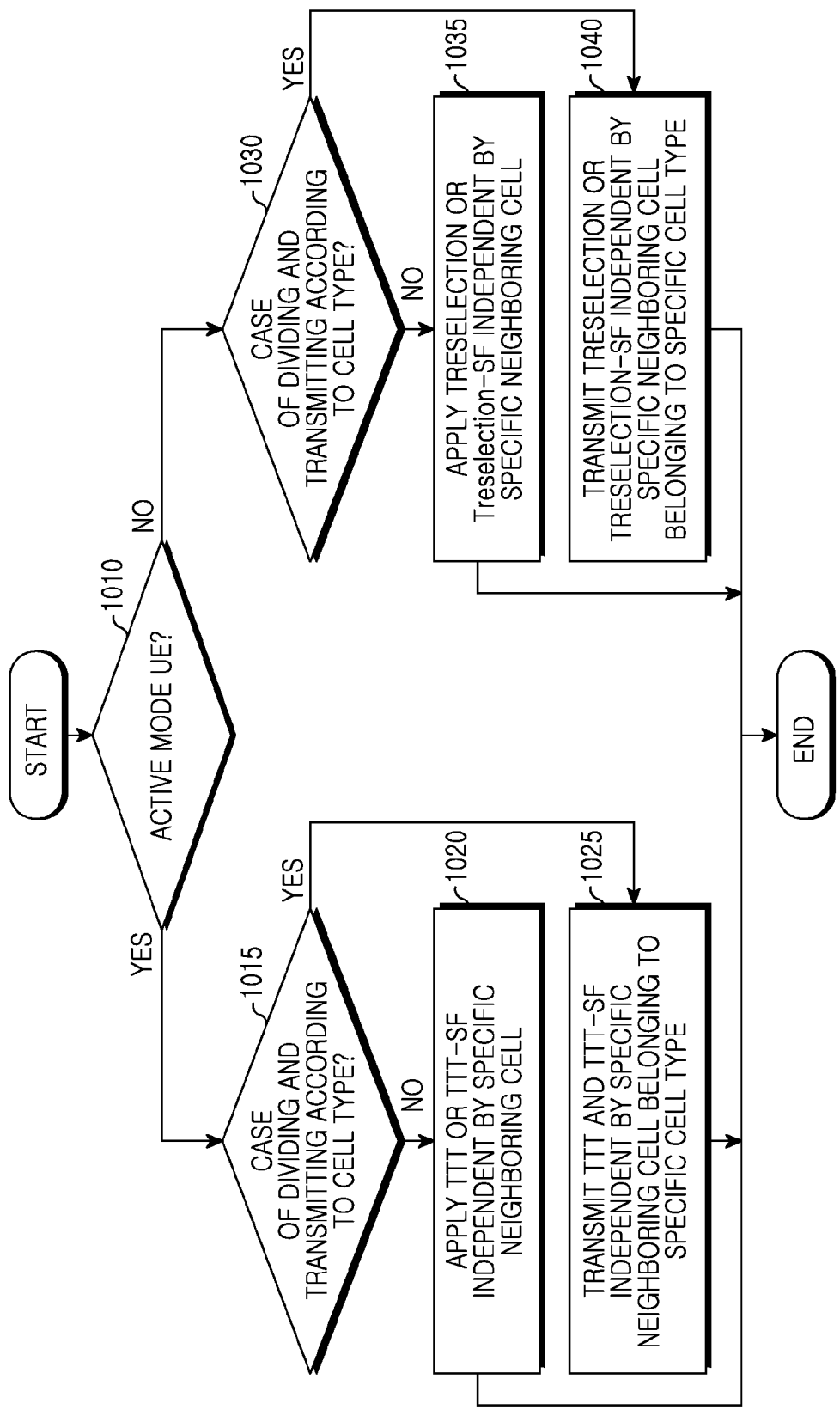
FIG. 10 is a flowchart illustrating a process of forwarding TTT and Treselection values independently by a neighboring eNB to a UE in a serving eNB according to an exemplary embodiment of the present invention.

FIG. 10 is a flowchart illustrating a process of forwarding TTT and Treselection values independently by a neighboring eNB to a UE in a serving eNB according to an exemplary embodiment of the present invention.

Referring to FIG. 10, when an object is an active mode UE at step 1010 and division is made according to a cell type at step 1015, the serving eNB sets and transmits a TTT value or a TTT-SF value independently by a neighboring cell belonging to a specific cell type at step 1025.

When the object is the active mode UE at step 1010 and division is not made according to the cell type at step 1515, the serving eNB sets and transmits a TTT value or a TTT-SF value independently by a specific neighboring cell at step 1020.

When the object is not the active mode UE but an idle mode UE at step 1010 and division is made according to the cell type at step 1030, the serving eNB sets and transmits a Treselection value or a Treselection-SF value independently by a neighboring cell belonging to a specific cell type step 1040.

When the object is the idle mode UE at step 1010 and the division is not made according to the cell type at step 1030, the serving eNB sets and transmits a Treselection value or a Treselection-SF value independently by a specific neighboring cell at step 1035.

A way for a serving eNB to forward a TTT value independently by a neighboring eNB to an active mode UE is described below.

Table 4 illustrates a case of setting a TTT value independently by a specific neighboring cell according to an exemplary embodiment of the present invention. Table 4 relates to a method (1-1) for setting a TTT value independently by a specific neighboring cell. In an LTE system of the related art, a MeasObjectEUTRA IE includes information necessary when an active mode UE determines neighboring cells.

dently by neighboring cell. So, a UE can apply a TTT value independently by a neighboring eNB. The 'cellIndividualTimeToTrigger' is shown in Table 5 below.

TABLE 5 cellIndividualTimeToTrigger
  Cell individual time to trigger parameter applicable to a specific neighboring cell.

TABLE 4

| MeasObjectEUTRA information element | | | |
|---|---|---|---|
| -- ASN1START | | | |
| MeasObjectEUTRA ::= | SEQUENCE { | | |
|     carrierFreq |     ARFCN-ValueEUTRA, | | |
|     allowedMeasBandwidth |     AllowedMeasBandwidth, | | |
|     presenceAntennaPort1 |     PresenceAntennaPort1, | | |
|     neighCellConfig |     NeighCellConfig, | | |
|     offsetFreq |     Q-OffsetRange | DEFAULT dB0, | |
|     -- Neighbour cell list | | | |
|     cellsToRemoveList |     CellIndexList | OPTIONAL, | -- Need ON |
|     cellsToAddModList |     CellsToAddModList | OPTIONAL, | -- Need ON |
|     -- Black list | | | |
|     blackCellsToRemoveList |     CellIndexList | OPTIONAL, | -- Need ON |
|     blackCellsToAddModList |     BlackCellsToAddModList | OPTIONAL, | -- Need ON |
|     cellForWhichToReportCGI |     PhysCellId | OPTIONAL, | -- Need ON |
|     ... | | | |
| } | | | |
| CellsToAddModList ::= | SEQUENCE (SIZE (1..maxCellMeas)) OF CellsToAddMod | | |
| CellsToAddMod ::=   SEQUENCE { | | | |
|     cellIndex |     INTEGER (1..maxCellMeas), | | |
|     physCellId |     PhysCellId, | | |
|     cellIndividualOffset |     Q-OffsetRange | | |
|     cellIndividualTimeToTrigger |     TimeToTrigger | OPTIONAL, | -- Need ON |
| } | | | |
| BlackCellsToAddModList ::= | SEQUENCE (SIZE (1..maxCellMeas)) OF BlackCellsToAddMod | | |
| BlackCellsToAddMod ::=   SEQUENCE { | | | |
|     cellIndex |     INTEGER (1..maxCellMeas), | | |
|     physCellIdRange |     PhysCellIdRange | | |
| } | | | |
| -- ASN1STOP | | | |

Table 4 adds a 'cellIndividualTimeToTrigger' field shown in a highlighted color, to the 'MeasObjectEUTRA' IE. The added 'cellIndividualTimeToTrigger' field represents a cell individual TTT value applied to a specific neighboring cell.

Similar to the 'cellIndividualOffset' field of the related art, the 'cellIndividualTimeToTrigger' field becomes a measurement report triggering related parameter applied independently by neighboring cell.

Table 6 illustrates a case of setting a TTT-SF value independently by a specific neighboring cell according to an exemplary embodiment of the present invention but applying and setting SF values set considering an existing speed state of a UE. Table 6 relates to a method (1-2) for setting a TTT-SF value independently by a specific neighboring cell.

TABLE 6

| MeasObjectEUTRA information element | | | |
|---|---|---|---|
| -- ASN1START | | | |
| MeasObjectEUTRA ::= | SEQUENCE { | | |
|     carrierFreq |     ARFCN-ValueEUTRA, | | |
|     allowedMeasBandwidth |     AllowedMeasBandwidth, | | |
|     presenceAntennaPort1 |     PresenceAntennaPort1, | | |
|     neighCellConfig |     NeighCellConfig, | | |
|     offsetFreq |     Q-OffsetRange | DEFAULT dB0, | |
|     -- Neighbour cell list | | | |
|     cellsToRemoveList |     CellIndexList | OPTIONAL, | -- Need ON |
|     cellsToAddModList |     CellsToAddModList | OPTIONAL, | -- Need ON |
|     -- Black list | | | |
|     blackCellsToRemoveList |     CellIndexList | OPTIONAL, | -- Need ON |
|     blackCellsToAddModList |     BlackCellsToAddModList | OPTIONAL, | -- Need ON |
|     cellForWhichToReportCGI |     PhysCellId | OPTIONAL, | -- Need ON |
|     ... | | | |
| } | | | |
| CellsToAddModList ::= | SEQUENCE (SIZE (1..maxCellMeas)) OF CellsToAddMod | | |
| CellsToAddMod ::=   SEQUENCE { | | | |
|     cellIndex |     INTEGER (1..maxCellMeas), | | |

TABLE 6-continued

MeasObjectEUTRA information element

| | | | |
|---|---|---|---|
| physCellId | PhysCellId, | | |
| cellIndividualOffset | Q-OffsetRange | | |
| cellIndividualTimeToTrigger-SF | SpeedTimeScaleFactors | OPTIONAL, | -- Need ON |
| } | | | |
| BlackCellsToAddModList ::= | SEQUENCE (SIZE (1..maxCellMeas)) OF BlackCellsToAddMod | | |
| BlackCellsToAddMod ::= SEQUENCE { | | | |
| cellIndex | INTEGER (1..maxCellMeas), | | |
| physCellIdRange | PhysCellIdRange | | |
| } | | | |
| -- ASN1STOP | | | |

The current LTE standard of the related art applies a 'speed-dependent' SF according to a speed of a UE.

In a case where an active mode UE has high and medium mobility, Table 6 multiplies a TTT by an SF-High value and an SF-Medium value, respectively.

So, in a case where a UE is fast, Table 6 can apply a TTT value less than an originally given TTT value. That is because, if the UE is fast, the TTT must be set lower to increase a HO success ratio.

This method can also reuse and apply SF values set considering a speed state of a UE presented in the current LTE standard as it is, or can newly set separate SF values.

More particularly, Table 6 relates to a method (1-2-1) for applying and setting SF values set considering an existing speed state of a UE, and adds a 'cellIndividualTimeToTrigger-SF' field shown in a highlighted color to a MeasObjectEUTRA IE.

The added 'cellIndividualTimeToTrigger-SF' field means a cell individual TTT-SF value applied to a specific neighboring cell. In the case of the specific neighboring cell, Table 6 can multiply an originally given TTT value by the SF value and set a TTT short.

Here, Table 6 applies a SpeedStateScaleFactors IE that includes SF values set considering a speed state of a UE presented in the current LTE standard of the related art, as it is. And, a CellIndividualTimeToTrigger-SF is shown in Table 7 below.

TABLE 7

CellIndividualTimeToTrigger-SF

Cell individual scaling factor applicable to a specific neighboring cell. The TimeToTrigger in ReportConfigEUTRA is multiplied by this scaling factor.

Table 8 illustrates a case (1-2-2) of setting a TTT-SF value independently by a specific neighboring cell according to an exemplary embodiment of the present invention but newly setting separate SF values. Table 8 adds a 'cellIndividualTimeToTrigger-SF' field shown in a highlighted color to a MeasObjectEUTRA IE.

TABLE 8

MeasObjectEUTRA information element

| | | | |
|---|---|---|---|
| -- ASN1START | | | |
| MeasObjectEUTRA ::= | SEQUENCE { | | |
| carrierFreq | ARFCN-ValueEUTRA, | | |
| allowedMeasBandwidth | AllowedMeasBandwidth, | | |
| presenceAntennaPort1 | PresenceAntennaPort1, | | |
| neighCellConfig | NeighCellConfig, | | |
| offsetFreq | Q-OffsetRange | DEFAULT dB0, | |
| -- Neighbour cell list | | | |
| cellsToRemoveList | CellIndexList | OPTIONAL, | -- Need ON |
| cellsToAddModList | CellsToAddModList | OPTIONAL, | -- Need ON |
| -- Black list | | | |
| blackCellsToRemoveList | CellIndexList | OPTIONAL, | -- Need ON |
| blackCellsToAddModList | BlackCellsToAddModList | OPTIONAL, | -- Need ON |
| cellForWhichToReportCGI | PhysCellId | OPTIONAL, | -- Need ON |
| ... | | | |
| } | | | |
| CellsToAddModList ::= | SEQUENCE (SIZE (1..maxCellMeas)) OF CellsToAddMod | | |
| CellsToAddMod ::= SEQUENCE { | | | |
| cellIndex | INTEGER (1..maxCellMeas), | | |
| physCellId | PhysCellId, | | |
| cellIndividualOffset | Q-OffsetRange | | |
| cellIndividualTimeToTrigger-SF | CellIndividualScaleFactors | OPTIONAL, | -- Need ON |
| } | | | |
| BlackCellsToAddModList ::= | SEQUENCE (SIZE (1..maxCellMeas)) OF BlackCellsToAddMod | | |
| BlackCellsToAddMod ::= SEQUENCE { | | | |
| cellIndex | INTEGER (1..maxCellMeas), | | |
| physCellIdRange | PhysCellIdRange | | |
| } | | | |
| -- ASN1STOP | | | |

The added 'cellIndividualTimeToTrigger-SF' field means a cell individual TTT-SF value applied to a specific neighboring cell. In the case of the specific neighboring cell, Table 8 can multiply an originally given TTT value by the SF value and set a TTT short.

Here, Table 8 uses a CellIndividualScaleFactors IE that is an SF related IE newly defined in an exemplary embodiment of the present invention. The CellIndividualTimeToTrigger-SF is shown in Table 9 below.

Table 10 represents a way for setting, to a MeasObjectEUTRA IE, a TTT value independently by neighboring cells belonging to a specific cell type according to an exemplary embodiment of the present invention.

Table 10 relates to a method (1-3) for setting a TTT value independently by neighboring cells belonging to a specific cell type. Table 10 can set (1-3-1), to a MeasObjectEUTRA IE, a TTT value independently by neighboring cells belonging to a specific cell type.

TABLE 10

| MeasObjectEUTRA information element |
|---|

```
-- ASN1START
MeasObjectEUTRA ::=              SEQUENCE {
    carrierFreq                      ARFCN-ValueEUTRA,
    allowedMeasBandwidth             AllowedMeasBandwidth,
    presenceAntennaPort1             PresenceAntennaPort1,
    neighCellConfig                  NeighCellConfig,
    offsetFreq                       Q-OffsetRange         DEFAULT dB0,
    -- Neighbour cell list
    cellsToRemoveList                CellIndexList         OPTIONAL,    -- Need ON
    cellsToAddModList                CellsToAddModList     OPTIONAL,    -- Need ON
    -- Black list
    blackCellsToRemoveList           CellIndexList         OPTIONAL,    -- Need ON
    blackCellsToAddModList           BlackCellsToAddModList OPTIONAL,   -- Need ON
    cellForWhichToReportCGI          PhysCellId            OPTIONAL,    -- Need ON
    ...
}
CellsToAddModList ::=            SEQUENCE (SIZE (1..maxCellMeas)) OF CellsToAddMod
CellsToAddMod ::=   SEQUENCE {
    cellIndex                        INTEGER (1..maxCellMeas),
    physCellId                       PhysCellId,
    cellIndividualOffset             Q-OffsetRange
    cellTypesList                    CellTypesList         OPTIONAL,    -- Need ON
}
BlackCellsToAddModList ::=       SEQUENCE (SIZE (1..maxCellMeas)) OF BlackCellsToAddMod
BlackCellsToAddMod ::=   SEQUENCE {
    cellIndex                        INTEGER (1..maxCellMeas),
    physCellIdRange                  PhysCellIdRange
}
CellTypesList ::=                SEQUENCE (SIZE (1..maxCellTypes)) OF CellTypes
CellTypes ::=   SEQUENCE {
    physCellIdRange                  PhysCellIdRange
    timeToTrigger                    TimeToTrigger
}
-- ASN1STOP
```

TABLE 9

| CellIndividualTimeToTrigger-SF |
|---|
| Cell individual scaling factor applicable to a specific neighboring cell. The TimeToTrigger in ReportConfigEUTRA is multiplied by this scaling factor. |

And, the CellIndividualScaleFactors IE is given as follows.

| CellIndividualScaleFactors information element |
|---|
| -- ASN1START<br>CellIndividualScaleFactors ::=   ENUMERATED (x_1, x_2, ..., x_n)<br>-- ASN1STOP |

Here, 'x_1', 'x_2', ..., 'x_n' values are mapped to values of 0 to 1.

First, when considering a case of setting to a MeasObjectEUTRA IE, Table 10 newly proposes a 'CellTypeList' field shown in a highlighted color in the MeasObjectEUTRA IE. The 'CellTypeList' field is designed to have TTT values different from each other every PCI range of a different cell type. A cell type list is shown in Table 11 below.

TABLE 11

| CellTypesList |
|---|
| List of cell types having individual different time which specific criteria for the event needs to be met in order to trigger a measurement report. |

Table 12 represents a way for setting, to a ReportConfigEUTRA IE, a TTT value independently by a neighboring cell belonging to a specific cell type according to an exemplary embodiment of the present invention.

Table 12 relates to a method (1-3) for setting a TTT value independently by neighboring cells belonging to a specific cell type. Table 12 can set (1-3-2), to a ReportConfigEUTRA IE, the TTT value independently by neighboring cells belonging to the specific cell type.

TABLE 12

ReportConfigEUTRA information element

```
-- ASN1START
ReportConfigEUTRA ::=      SEQUENCE {
  triggerType                CHOICE {
    event                      SEQUENCE {
      eventId                    CHOICE {
        eventA1                    SEQUENCE {
          a1-Threshold               ThresholdEUTRA
        },
        eventA2                    SEQUENCE {
          a2-Threshold               ThresholdEUTRA
        },
        eventA3                    SEQUENCE {
          a3-Offset                  INTEGER (-30..30),
          reportOnLeave              BOOLEAN
        },
        eventA4                    SEQUENCE {
          a4-Threshold               ThresholdEUTRA
        },
        eventA5                    SEQUENCE {
          a5-Threshold1              ThresholdEUTRA,
          a5-Threshold2              ThresholdEUTRA
        },
        ...
      },
      hysteresis                 Hysteresis,
      timeToTrigger              TimeToTrigger,
      cellTypesList              CellTypesList            OPTIONAL   --Need ON
    },
    periodical                 SEQUENCE {
      purpose                    ENUMERATED {
                                   reportStrongestCells, reportCGI)
    }
  },
  triggerQuantity            ENUMERATED (rsrp, rsrq),
  reportQuantity             ENUMERATED (sameAsTriggerQuantity, both),
  maxReportCells             INTEGER (1..maxCellReport),
  reportInterval             ReportInterval,
  reportAmount               ENUMERATED (r1, r2, r4, r8, r16, r32, r64, infinity),
  ...,
  reportConfigEUTRA-v9x0     ReportConfigEUTRA-v9x0-IEs  OPTIONAL   --Need ON
}
CellTypesList ::=          SEQUENCE (SIZE (1..maxCellTypes)) OF CellTypes
CellTypes ::=   SEQUENCE {
  physCellIdRange            PhysCellIdRange,
  timeToTrigger              TimeToTrigger
}
```

Table 12 newly proposes a 'CellTypeList' field shown in a highlighted color in the ReportConfigEUTRA IE. The 'CellTypeList' field is designed to have a TTT value different from each other every PCI range of a different cell type. Here, a cell type list is shown in Table 13 below.

TABLE 13

CellTypesList
List of cell types having individual different time which specific TABLE 13-continued criteria for the event needs to be met in order to trigger a measurement report.

Table 14 illustrates a case of applying SF values set considering an existing speed state of a UE and setting, to a MeasObjectEUTRA IE, a TTT-SF value independently by neighboring cells belonging to a specific cell type according to an exemplary embodiment of the present invention.

TABLE 14

MeasObjectEUTRA information element

```
-- ASN1START
MeasObjectEUTRA ::=        SEQUENCE {
  carrierFreq                ARFCN-ValueEUTRA,
  allowedMeasBandwidth       AllowedMeasBandwidth,
  presenceAntennaPort1       PresenceAntennaPort1,
  neighCellConfig            NeighCellConfig,
  offsetFreq                 Q-OffsetRange              DEFAULT dB0,
  -- Neighbour cell list
  cellsToRemoveList          CellIndexList              OPTIONAL,    -- Need ON
  cellsToAddModList          CellsToAddModList          OPTIONAL,    -- Need ON
  -- Black list
```

TABLE 14-continued

| MeasObjectEUTRA information element | | | |
|---|---|---|---|
| blackCellsToRemoveList | CellIndexList | OPTIONAL, | -- Need ON |
| blackCellsToAddModList | BlackCellsToAddModList, | OPTIONAL, | -- Need ON |
| cellForWhichToReportCGI | PhysCellId | OPTIONAL, | -- Need ON |
| ... | | | |
| } | | | |
| CellsToAddModList ::= | SEQUENCE (SIZE (1..maxCellMeas)) OF CellsToAddMod | | |
| CellsToAddMod ::=  SEQUENCE { | | | |
|   cellIndex | INTEGER (1..maxCellMeas), | | |
|   physCellId | PhysCellId, | | |
|   cellIndividualOffset | Q-offsetRange, | | |
|   cellTypesList | CellTypesList | OPTIONAL | -- Need ON |
| } | | | |
| BlackCellsToAddModList ::= | SEQUENCE (SIZE (1..maxCellMeas)) OF BlackCellsToAddMod | | |
| BlackCellsToAddMod ::= SEQUENCE { | | | |
|   cellIndex | INTEGER (1..maxCellMeas), | | |
|   physCellIdRange | PhysCellIdRange | | |
| } | | | |
| CellTypesList ::= | SEQUENCE (SIZE (1..maxCellTypes)) OF CellTypes | | |
| CellTypes ::=  SEQUENCE { | | | |
|   physCellIdRange | PhysCellIdRange, | | |
|   timeToTrigger-SF | SpeedStaterScaleFactors | | |
| } | | | |
| -- ASN1STOP | | | |

Table 14 relates to a method (1-4) for setting a TTT-SF value independently by neighboring cells belonging to a specific cell type. The TTT-SF value independently by neighboring cells belonging to the specific cell type can be set to a MeasObjectEUTRA IE (1-4-1) or a ReportConfigEUTRA IE (1-4-2).

Table 14 newly proposes a 'CellTypeList' field shown in a highlighted color in the MeasObjectEUTRA IE. The 'CellTypeList' field is designed to have TTT-SF values different from each other every PCI range of a different cell type.

As in the example (1-2), even this example (1-4-1) can apply (1-4-1-1) reusing, as it is, SF values set considering a speed state of a UE presented in the current LTE standard. Here, a cell type list is shown in Table 15 below.

TABLE 15

CellTypesList
  List of cell types having individual scaling factor applicable to a neighboring cell(s) belonging to a specific cell type. The TimeToTrigger in ReportConfigEUTRA is multiplied by this scaling factor.

Table 16 represents a case of newly setting, to a MeasObjectEUTRA IE, a TTT-SF value independently by neighboring cells belonging to a specific cell type according to an exemplary embodiment of the present invention.

TABLE 16

| MeasObjectEUTRA information element | | | |
|---|---|---|---|
| -- ASN1START | | | |
| MeasObjectEUTRA ::= | SEQUENCE { | | |
|   carrierFreq | ARFCN-ValueEUTRA, | | |
|   allowedMeasBandwidth | AllowedMeasBandwidth, | | |
|   presenceAntennaPort1 | PresenceAntennaPort1, | | |
|   neighCellConfig | NeighCellConfig, | | |
|   offsetFreq | Q-OffsetRange | DEFAULT dB0, | |
|   -- Neighbour cell list | | | |
|   cellsToRemoveList | CellIndexList | OPTIONAL, | -- Need ON |
|   cellsToAddModList | CellsToAddModList | OPTIONAL, | -- Need ON |
|   -- Black list | | | |
|   blackCellsToRemoveList | CellIndexList | OPTIONAL, | -- Need ON |
|   blackCellsToAddModList | BlackCellsToAddModList, | OPTIONAL, | -- Need ON |
|   cellForWhichToReportCGI | PhysCellId | OPTIONAL, | -- Need ON |
|   ... | | | |
| } | | | |
| CellsToAddModList ::= | SEQUENCE (SIZE (1..maxCellMeas)) OF CellsToAddMod | | |
| CellsToAddMod ::=  SEQUENCE { | | | |
|   cellIndex | INTEGER (1..maxCellMeas), | | |
|   physCellId | PhysCellId, | | |
|   cellIndividualOffset | Q-OffsetRange, | | |
|   cellTypesList | CellTypesList | OPTIONAL | -- Need ON |
| } | | | |
| BlackCellsToAddModList ::= | SEQUENCE (SIZE (1..maxCellMeas)) OF BlackCellsToAddMod | | |
| BlackCellsToAddMod ::= SEQUENCE { | | | |
|   cellIndex | INTEGER (1..maxCellMeas), | | |
|   physCellIdRange | PhysCellIdRange | | |
| } | | | |
| CellTypeList ::= | SEQUENCE (SIZE (1..maxCellTypes)) OF CellTypes | | |
| CellTypes ::=  SEQUENCE { | | | |

TABLE 16-continued

| MeasObjectEUTRA information element | |
|---|---|
| physCellIdRange | PhysCellIdRange, |
| timeToTrigger-SF | CellIndividualScaleFactors |
| } | |
| -- ASN1STOP | |

Table 16 relates to a method for setting a TTT-SF value independently by neighboring cells belonging to a specific cell type. The TTT-SF value independently by neighboring cells belonging to the specific cell type can be set to a MeasObjectEUTRA IE (1-4-1) or a ReportConfigEUTRA IE (1-4-2).

Table 16 newly proposes a 'CellTypeList' field shown in a highlighted color in the MeasObjectEUTRA IE. The 'CellTypeList' field is designed to have TTT-SF values different from each other every PCI range of a different cell type.

Similar to the example (1-2), even this example (1-4-1) can also newly set (1-4-1-2) separate SF values considering a speed state of a UE presented in the current LTE standard of the related art. Here, a cell type list is shown in Table 17 below.

TABLE 17

| CellTypesList |
|---|
| List of cell types having individual scaling factor applicable to a |

TABLE 17-continued

| neighboring cell(s) belonging to a specific cell type. The TimeToTrigger in ReportConfigEUTRA is multiplied by this scaling factor. |
|---|

| CellIndividualScaleFactors information element |
|---|
| -- ASN1START |
| CellIndividualScaleFactors ::= ENUMERATED {x_1, x_2, . . . , x_n} |
| -- ASN1STOP |

Here, 'x_1', 'x_2', . . . , 'x_n' values are mapped to values of 0 to 1.

Table 18 represents a case of applying SF values set considering an existing speed state of a UE and setting, to a ReportConfigEUTRA IE, a TTT-SF independently by neighboring cells belonging to a specific cell type according to an exemplary embodiment of the present invention.

This relates to a method (1-4) for setting a TTT-SF value independently by neighboring cells belonging to a specific cell type. The TTT-SF value independently by neighboring cells belonging to the specific cell type can be set to the MeasObjectEUTRA IE (1-4-1) or the ReportConfigEUTRA IE (1-4-2).

TABLE 18

| ReportConfigEUTRA information element | | |
|---|---|---|
| -- ASN1START | | |
| ReportConfigEUTRA ::= | SEQUENCE { | |
| triggerType | CHOICE { | |
| event | SEQUENCE { | |
| eventId | CHOICE { | |
| eventA1 | SEQUENCE { | |
| a1-Threshold | ThresholdEUTRA | |
| }, | | |
| eventA2 | SEQUENCE { | |
| a2-Threshold | ThresholdEUTRA | |
| }, | | |
| eventA3 | SEQUENCE { | |
| a3-Offset | INTEGER (−30..30), | |
| reportOnLeave | BOOLEAN | |
| }, | | |
| eventA4 | SEQUENCE { | |
| a4-Threshold | ThresholdEUTRA | |
| }, | | |
| eventA5 | SEQUENCE { | |
| a5-Threshold1 | ThresholdEUTRA, | |
| a5-Threshold2 | ThresholdEUTRA | |
| }, | | |
| ... | | |
| }, | | |
| hysteresis | Hysteresis, | |
| timeToTrigger | TimeToTrigger, | |
| cellTypeList | CellTypesList | OPTIONAL --Need ON |
| }, | | |
| periodical | SEQUENCE { | |
| purpose | ENUMERATED { | |
| | reportStrongestCells, reportCGI} | |
| } | | |
| }, | | |
| triggerQuantity | ENUMERATED (rsrp, rsrq), | |
| reportQuantity | ENUMERATED (sameAsTriggerQuantity, both), | |
| maxReportCells | INTEGER (1..maxCellReport), | |
| reportInterval | ReportInterval, | |
| reportAmount | ENUMERATED (r1, r2, r4, r8, r16, r32, r64, infinity), | |
| ..., | | |

TABLE 18-continued

| ReportConfigEUTRA information element | |
|---|---|
| reportConfigEUTRA-v9x0 | ReportConfigEUTRA-v9x0-IEs OPTIONAL  --Need ON |
| } | |
| CellTypesList ::= | SEQUENCE (SIZE (1, maxCellTypes)) OF CellTypes |
| CellTypes ::= SEQUENCE { | |
| physCellIdRange | PhysCellIdRange, |
| timeToTrigger | SpeedStateScaleFactors |
| } | |

In Table 18 above, an exemplary embodiment of the present invention newly proposes a 'CellTypeList' field shown in a highlighted color in the ReportConfigEUTRA IE. The 'CellTypeList' field is designed to have TTT-SF values different from each other every PCI range of a different cell type.

Similar to the example (1-2), even this example (1-4-2) can also apply reusing SF values set considering a speed state of a UE presented in the current LTE standard of the related art. Here, a cell type list is shown in Table 19.

TABLE 19

CellTypesList
List of cell types having individual scaling factor applicable to a TABLE 19-continued neighboring cell(s) belonging to a specific cell type. The TimeToTrigger in ReportConfigEUTRA is multiplied by this scaling factor.

Table 20 represents a case of newly setting, to a ReportConfigEUTRA IE, a TTT-SF value independently by neighboring cells belonging to a specific cell type according to an exemplary embodiment of the present invention.

Table 20 is about a way (1-4) for setting a TTT-SF value independently by neighboring cells belonging to a specific cell type. The TTT-SF value independently by neighboring cells belonging to the specific cell type can be set to a MeasObjectEUTRA IE (1-4-1) or a ReportConfigEUTRA IE (1-4-2).

TABLE 20

| ReportConfigEUTRA information element | |
|---|---|
| -- ASN1START | |
| ReportConfigEUTRA ::= | SEQUENCE { |
| triggerType | CHOICE { |
| event | SEQUENCE { |
| eventId | CHOICE { |
| eventA1 | SEQUENCE { |
| a1-Threshold | ThresholdEUTRA |
| }, | |
| eventA2 | SEQUENCE { |
| a2-Threshold | ThresholdEUTRA |
| }, | |
| eventA3 | SEQUENCE { |
| a3-Offset | INTEGER (-30..30), |
| reportOnLeave | BOOLEAN |
| }, | |
| eventA4 | SEQUENCE { |
| a4-Threshold | ThresholdEUTRA |
| }, | |
| eventA5 | SEQUENCE { |
| a5-Threshold1 | ThresholdEUTRA, |
| a5-Threshold2 | ThresholdEUTRA |
| }, | |
| ... | |
| }, | |
| hysteresis | Hysteresis, |
| timeToTrigger | TimeToTrigger, |
| cellTypesList | CellTypesList            OPTIONAL    --Need ON |
| }, | |
| periodical | SEQUENCE { |
| purpose | ENUMERATED { |
| | reportStrongestCells, reportCGI} |
| } | |
| }, | |
| triggerQuantity | ENUMERATED (rsrp, rsrq), |
| reportQuantity | ENUMERATED (sameAsTriggerQuantity, both), |
| maxReportCells | INTEGER (1..maxCellReport), |
| reportInterval | ReportInterval, |
| reportAmount | ENUMERATED (r1, r2, r4, r8, r16, r32, r64, infinity), |
| ..., | |
| reportConfigEUTRA-v9x0 | ReportConfigEUTRA-v9x0-IEs OPTIONAL   --Need ON |
| } | |

TABLE 20-continued

| ReportConfigEUTRA information element | |
|---|---|
| CellTypesList ::= | SEQUENCE (SIZE (1, maxCellTypes)) OF CellTypes |
| CellTypes ::= SEQUENCE { | |
|   physcellIdRange | PhysCellIdRange, |
|   timetoTrigger | CellIndividualScaleFactors |
| } | |

As in Table 20, an exemplary embodiment of the present invention newly proposes a 'CellTypeList' field shown in a highlighted color in the ReportConfigEUTRA IE. The 'CellTypeList' field is designed to have TTT-SF values different from each other every PCI range of a different cell type.

Similar to the example (1-2), even this example (1-4-2) can also newly set separate SF values considering a speed state of a UE presented in the current LTE standard of the related art. Here, a cell type list is shown in Table 21 below.

TABLE 21

| CellTypesList |
|---|
| List of cell types having individual scaling factor applicable to a neighboring cell(s) belonging to a specific cell type. The TimeToTrigger in ReportConfigEUTRA is multiplied by this scaling factor. |

TABLE 21-continued

| CellIndividualScaleFactors information element |
|---|
| -- ASN1START |
| CellIndividualScaleFactors ::=    ENUMERATED {x_1, x_2, ..., x_n} |
| -- ASN1STOP |

Here, 'x_1', 'x_2', . . . , 'x_n' values are mapped to values of 0 to 1.

(2) A way for a serving eNB to forward a Treselection value independently by a neighboring eNB to an idle mode UE is described below.

Table 22 represents a case of setting a Treselection value independently by a specific neighboring cell according to an exemplary embodiment of the present invention.

Table 22 relates to a method (2-1) of setting the Treselection value independently by a specific neighboring cell. In the LTE standard of the related art, an eNB can forward a Treselection value to an idle mode UE through a SystemInformationBlock3 (SIB3).

TABLE 22

| SystemInformationBlockType3 information element | | | |
|---|---|---|---|
| -- ASN1START | | | |
| SystemInformationsBlockType3 ::= | SEQUENCE { | | |
|   cellReselectionInfoCommon | SEQUENCE { | | |
|     q-Hyst | ENUMERATED { | | |
| |   dB0, dB1, dB2, dB3, dB4, dB5, dB6, dB8, dB10, | | |
| |   dB12, dB14, dB16, dB18, dB20, dB22, dB24}, | | |
|   speedStateReselectionPars | SEQUENCE { | | |
|     mobilityStateParameters | MobilityStateParameters, | | |
|     q-HystSF | SEQUENCE { | | |
|       sf-Medium | ENUMERATED { | | |
| |   dB-6, dB-4, dB-2, dB0}, | | |
|       sf-High | ENUMERATED { | | |
| |   dB-6, dB-4, dB-2, dB0} | | |
|     } | | | |
|   } | | OPTIONAL | -- Need OP |
| }, | | | |
| cellReselectionServingFreqInfo | SEQUENCE { | | |
|   s-NonIntreSearch | ReselectionThreshold | OPTIONAL, | -- Need OP |
|   threshServingLow | ReselectionThreshold, | | |
|   cellReselectionPriority | CellReselectionPriority | | |
| }, | | | |
| intraFreqCellReselectionInfo | SEQUENCE { | | |
|   q-RxLevMin | Q-RxLevMin, | | |
|   p-Max | P-Max | OPTIONAL, | -- Need OP |
|   s-IntraSearch | ReselectionThreshold | OPTIONAL, | -- Need OP |
|   allowedMeasBandwidth | AllowedMeasBandwidth | OPTIONAL, | -- Need OP |
|   presenceAntennaPort1 | PresenceAntennaPorti, | | |
|   neighCellConfig | NeighCellConfig, | | |
|   t-ReselectionEUTRA | T-Reselection, | | |
|   cellIndividualInfoList | CellIndividualInfoList, | OPTIONAL, | -- Need OP |
|   t-ReselectionEUTRA-SF | SpeedStateScaleFactors | OPTIONAL | -- Need OP |
|   cellTypeList | CellTypeList | | |
| }, | | | |
| ... | | | |
| } | | | |
| CellIndividualInfoList ::= | SEQUENCE (SIZE (1..N)) OF CellIndividualInfo | | |
| CellIndividualInfo ::= SEQUENCE { | | | |
|   physCellId | PhysCellId, | | |
|   cellIndividual-t-ReselectionEUTRA | T-Reselection | | |
| } | | | |
| -- ASN1STOP | | | |

In general, the SIB3 includes common information for performing cell reselection irrespective of intra-frequency/inter-frequency/inter-RAT cell reselection.

This example (2-1) has no restriction even from any SIB that an idle mode UE can receive but, as an exemplary embodiment, is set to the SIB3 currently including the Treselection value.

As in the drawings, an exemplary embodiment of the present invention newly proposes a 'cellIndividualInfoList'

Table 24 relates to a method of applying and setting an SF value set considering an existing speed of a UE, to a Treselection-SF value independently by a specific neighboring cell according to an exemplary embodiment of the present invention.

Table 24 relates to a method (2-2) for setting a Treselection-SF value independently by a specific neighboring cell. Like the TTT-SF, the current LTE standard applies a 'speed-dependent' SF according to a speed of a UE.

TABLE 24

| SystemInformationBlockType3 information element |
|---|

```
-- ASN1START
SystemInformationBlockType3 ::=    SEQUENCE {
    cellReselectionInfoCommon          SEQUENCE {
        q-Hyst                             ENUMERATED {
                                               dB0, dB1, dB2, dB3, dB4, dB5, dB6, dB8, dB10,
                                               dB12, dB14, dB16, dB18, dB20, dB22, dB24},
        speedStateReselectionPars          SEQUENCE {
            mobilityStateParameters            MobilityStateParameters,
            q-HystSF                           SEQUENCE {
                sf-Medium                          ENUMERATED {
                                                       dB-6, dB-4, dB-2, dB0},
                sf-High                            ENUMERATED {
                                                       dB-6, dB-4, dB-2, dB0}
            }
        }                                                          OPTIONAL    -- Need OP
    },
    cellReselectionServingFreqInfo     SEQUENCE {
        s-NonIntraSearch                   ReselectionThreshold    OPTIONAL,   -- Need OP
        threshServingLow                   ReselectionThreshold,
        cellReselectionPriority            CellReselectionPriority
    },
    intraFreqCellReselectionInfo       SEQUENCE {
        q-RxLevMin                         Q-RxLevMin,
        p-Max                              P-Max                   OPTIONAL,   -- Need OP
        s-IntraSearch                      ReselectionThreshold    OPTIONAL,   -- Need OP
        allowedMeasBandwidth               AllowedMeasBandwidth    OPTIONAL,   -- Need OP
        presenceAntennaPort1               PresenceAntennaPort1,
        neighCellConfig                    NeighCellConfig,
        t-ReselectionEUTRA                 T-Reselection,
        cellIndividualInfoList             CellIndividualInfoList  OPTIONAL,   -- Need OP
        t-ReselectionEUTRA-SF              SpeedStateScaleFactors  OPTIONAL    -- Need OP
        cellTypeList                       CellTypeList
    },
    ...
}
CellIndividualInfoList ::=    SEQUENCE (SIZE (1..N)) OF CellIndividualInfo
CellIndividualInfo ::= SEQUENCE {
    physCellId                             PhysCellId,
    cellIndividual-t-ReselectionEUTRA-SF   SpeedStateScaleFactors
}
-- ASN1STOP
``` field that is a part shown in a highlighted color in the SIB3. Within the 'cellIndividualInfoList' field, 'cellIndividualInfo' fields of 'N' number are set.

Within the 'cellIndividualInfo' field, a 'cellIndividual-t-Reselection' field that is a Treselection value independently every neighboring cell is set. A phyCellId and a cellIndividual-t-ReselectionEUTRA are shown in Table 23 below.

TABLE 23

| |
|---|
| phyCellId |
| Physical cell identity of a cell in neighboring cell list. |
| cellIndividual-t-ReselectionEUTRA |
| Cell individual parameter "TreselectionEUTRAN" applicable to a specific neighboring cell. |

In a case where an idle mode UE has high and medium mobility, Table 24 applies multiplying a Treselection value by an sf-High value and an sf-Medium value. So, in a case where a UE is fast in speed, Table 24 can apply a Treselection value less than an originally given Treselection value.

The example (2-2) can apply (2-2-1) SF values set considering a speed state of an idle mode UE presented in the LTE standard, or can newly set (2-2-2) separate SF values.

And, the example (2-2) is irrespective of even any SIB that an idle mode UE can receive but, as an exemplary embodiment, is set to an SIB3 currently including a Treselection-SF value.

As in the drawings, an exemplary embodiment of the present invention newly proposes a 'cellIndividualInfoList' field that is a part shown in a highlighted color in the SIB3. Within the 'cellIndividualInfoList' field, 'cellIndividualInfo' fields of 'N' number are set.

Within the 'cellIndividualInfo' field, a 'cellIndividual-t-Reselection-SF' field that is a Treselection-SF value independently each neighboring cell is set.

The added 'cellIndividual-t-Reselection-SF' field means a cell individual Treselection-SF value applied to a specific neighboring cell. In the case of the specific neighboring cell, Table 24 can multiply an originally given Treselection value by the SF value and set a TTT short.

Here, Table 24 applies (2-2-1), as it is, a SpeedStateScaleFactors IE that includes SF values set considering a speed state of a UE presented in the LTE standard. Here, a phyCellId and a cellIndividual-t-ReselectionEUTRA-SF are shown in Table 25 below.

TABLE 25 phyCellId
Physical cell identity of a cell in neighboring cell list.
cellIndividual-t-ReselectionEUTRA-SF
Cell individual parameter "Speed dependent Scaling Factor for TreselectionEUTRAN"

Table 26 illustrates a case of newly setting separate SF values to a Treselection-SF value independently by a specific neighboring cell according to an exemplary embodiment of the present invention.

In the case of newly setting the separate SF values, an exemplary embodiment of the present invention newly proposes a 'cellIndividualInfoList' field that is a part shown in a highlighted color in an SIB3.

Within the 'cellIndividualInfoList' field, 'cellIndividualInfo' fields of 'N' number are set. Within the 'cellIndividualInfo' field, a 'cellIndividual-t-Reselection-SF' field that is a Treselection-SF value independently by a neighboring cell is set.

The added 'cellIndividual-t-Reselection-SF' field means a cell individual Treselection-SF value applied to a specific neighboring cell. In the case of the specific neighboring cell, Table 26 can multiply an originally given Treselection value by the SF value and set a TTT short.

Here, an exemplary embodiment of the present invention uses (2-2-2) 'CellIndividualScaleFactors' that are a newly defined scale factor related IE. Here, a phyCellId and a cellIndividual-t-ReselectionEUTRA-SF are shown in Table 27 below.

TABLE 27 phyCellId
Physical cell identity of a cell in neighboring cell list.
cellIndividual-t-ReselectionEUTRA-SF
Cell individual parameter "Speed dependent Scaling Factor for TreselectionEUTRAN"

CellIndividualScaleFactors information element

-- ASN1START
CellIndividualScaleFactors ::=  ENUMERATED {x_1, x_2, . . . , x_n}
-- ASN1STOP

TABLE 26

SystemInformationBlockType3 information element

```
-- ASN1START
SystemInformationBlockType3 ::=   SEQUENCE {
  cellReselectionInfoCommon          SEQUENCE {
    q-Hyst                             ENUMERATED {
                                         dB0, dB1, dB2, dB3, dB4, dB5, dB6, dB8, dB10,
                                         dB12, dB14, dB16, dB18, dB20, dB22, dB24},
    speedStateReselectionPars          SEQUENCE {
      mobilityStateParameters            MobilityStateParameters,
      q-HystSF                           SEQUENCE {
        sf-Medium                          ENUMERATED {
                                             dB-6, dB-4, dB-2, dB0},
        sf-High                            ENUMERATED {
                                             dB-6, dB-4, dB-2, dB0}
      }
    }                                                      OPTIONAL    -- Need OP
  },
  cellReselectionServingFreqInfo     SEQUENCE {
    s-NonIntraSearch                   ReselectionThreshold  OPTIONAL,  -- Need OP
    threshServingLow                   ReselectionThreshold,
    cellReselectionPriority            CellReselectionPriority
  },
  intraFreqCellReselectionInfo       SEQUENCE {
    q-RxLevMin                         Q-RxLevMin,
    p-Max                              P-Max                 OPTIONAL,  -- Need OP
    s-IntraSearch                      ReselectionThreshold  OPTIONAL,  -- Need OP
    allowedMeasBandwidth               AllowedMeasBandwidth  OPTIONAL,  -- Need OP
    presenceAntennaPort1               PresenceAntennaPort1,
    neighCellConfig                    NeighCellConfig,
    t-ReselectionEUTRA                 T-Reselection,
    cellIndividualInfoList             CellIndividualInfoList OPTIONAL, -- Need OP
    t-ReselectionEUTRA-SF              SpeedStateScaleFactors OPTIONAL  -- Need OP
    cellTypeList                       CellTypeList
  },
  ...
}
CellIndividualInfoList ::=    SEQUENCE (SIZE (1..N)) OF CellIndividualInfo
CellIndividualInfo ::= SEQUENCE {
    physCellId                         PhysCellId,
    cellIndividual-t-ReselectionEUTRA-SF   CellIndividualScaleFactors
}
-- ASN1STOP
```

Here, 'x_1', 'x_2', ..., 'x_n' values are mapped to values of 0 to 1.

Table 28 illustrates a case of setting a Treselection value by a neighboring cell belonging to a specific cell type according to an exemplary embodiment of the present invention.

Table 28 relates to a method (2-3) for setting a Treselection value independently by neighboring cells belonging to the specific cell type. Table 28 has no restriction from any SIB that an idle mode UE can receive but, as an exemplary embodiment, is set to an SIB3 currently including the Treselection value.

TABLE 28

SystemInformationBlockType3 information element

```
-- ASN1START
SystemInformationBlockType3 ::= SEQUENCE {
    cellReselectionInfoCommon      SEQUENCE {
        q-Hyst                         ENUMERATED {
                                          dB0, dB1, dB2, dB3, dB4, dB5, dB6, dB8, dB10,
                                          dB12, dB14, dB16, dB18, dB20, dB22, dB24},
        speedStateReselectionPars      SEQUENCE {
            mobilityStateParameters        MobilityStateParameters,
            q-HystSF                       SEQUENCE {
                sf-Medium                      ENUMERATED {
                                                  dB-6, dB-4, dB-2, dB0},
                sf-High                        ENUMERATED {
                                                  dB-6, dB-4, dB-2, dB0}
            }
        }                                                        OPTIONAL    -- Need OP
    },
    cellReselectionServingFreqInfo SEQUENCE {
        s-NonIntraSearch               ReselectionThreshold       OPTIONAL,   -- Need OP
        threshServingLow               ReselectionThreshold,
        cellReselectionPriority        CellReselectionPriority
    },
    intraFreqCellReselectionInfo   SEQUENCE {
        q-RxLevMin                     Q-RxLevMin,
        p-Max                          P-Max                      OPTIONAL,   -- Need OP
        s-IntraSearch                  ReselectionThreshold       OPTIONAL,   -- Need OP
        allowedMeasBandwidth           AllowedMeasBandwidth       OPTIONAL,   -- Need OP
        presenceAntennaPort1           PresenceAntennaPort1,
        neighCellConfig                NeighCellConfig,
        t-ReselectionEUTRA             T-Reselection,
        cellIndividualInfoList         CellIndividualInfoList,    OPTIONAL,   -- Need OP
        t-ReselectionEUTRA-SF          SpeedStateScaleFactors     OPTIONAL    -- Need OP
        cellTypeList                   CellTypeList
    },
    ...
}
CellIndividualInfoList ::=     SEQUENCE (SIZE (1..N)) OF CellIndividualInfo
CellIndividualInfo ::= SEQUENCE {
    physCellRange                  PhysCellRange,
    cellIndividual-t-ReselectionEUTRA     T-Reselection
}
-- ASN1STOP
```

In Table 28, an exemplary embodiment of the present invention newly proposes a 'cellIndividualInfoList' field that is a part shown in a highlighted color in the SIB3. Within the 'cellIndividualInfoList' field, 'cellIndividualInfo' fields of 'N' number are set.

Within the 'cellIndividualInfo' field, a 'cellIndividual-t-ReselectionEUTRA' field that is a Treselection value independently every PCI range of a specific cell type is set. A phyCellIdRange and a cellIndividual-t-ReselectionEUTRA are shown in Table 29 below.

TABLE 29 phyCellIdRange
    A range of physical cell identities in neighboring cell list.
cellIndividual-t-ReselectionEUTRA
    Cell individual parameter "TreselectionEUTRAN" applicable to a specific neighboring cell Table 30 relates to a method of applying SF values set considering an existing speed of a UE and setting a Treselection-SF value by neighboring cell belonging to a specific cell type according to an exemplary embodiment of the present invention.

Table 30 relates to a method (2-4) for setting a Treselection-SF value independently by neighboring cells belonging to a specific cell type. Table 30 is irrespective of any SIB that an idle mode UE can receive but, as an exemplary embodiment, is set to an SIB3 currently including the Treselection-SF value. The example (2-4) can consider an example (2-4-1) for applying and setting SF values set considering an existing speed state of a UE.

TABLE 30

SystemInformationBlockType3 information element

```
-- ASN1START
SystemInformationsBlockType3 ::=    SEQUENCE {
    cellReselectionInfoCommon           SEQUENCE {
        q-Hyst                              ENUMERATED {
                                                dB0, dB1, dB2, dB3, dB4, dB5, dB6, dB8, dB10,
                                                dB12, dB14, dB16, dB18, dB20, dB22, dB24},
        speedStateReselectionPars           SEQUENCE {
            mobilityStateParameters             MobilityStateParameters,
            q-HystSF                            SEQUENCE {
                sf-Medium                           ENUMERATED {
                                                        dB-6, dB-4, dB-2, dB0},
                sf-High                             ENUMERATED {
                                                        dB-6, dB-4, dB-2, dB0}
            }
        }                                                           OPTIONAL    -- Need OP
    },
    cellReselectionServingFreqInfo      SEQUENCE {
        s-NonIntraSearch                    ReselectionThreshold    OPTIONAL,   -- Need OP
        threshServingLow                    ReselectionThreshold,
        cellReselectionPriority             CellReselectionPriority
    },
    intraFreqCellReselectionInfo        SEQUENCE {
        q-RxLevMin                          Q-RxLevMin,
        p-Max                               P-Max                   OPTIONAL,   -- Need OP
        s-IntraSearch                       ReselectionThreshold    OPTIONAL,   -- Need OP
        allowedMeasBandwidth                AllowedMeasBandwidth    OPTIONAL,   -- Need OP
        presenceAntennaPort1                PresenceAntennaPort1,
        neighCellConfig                     NeighCellConfig,
        t-ReselectionEUTRA                  T-Reselection,
        cellIndividualInfoList              CellIndividualInfoList, OPTIONAL,   -- Need OP
        t-ReselectionEUTRA-SF               SpeedStateScaleFactors  OPTIONAL    -- Need OP
        cellTypeList                        CellTypeList
    },
    ...
}
CellIndividualInfoList ::=      SEQUENCE (SIZE (1..N)) OF CellIndividualInfo
CellIndividualInfo ::= SEQUENCE {
    physCellRange                       PhysCellRange,
    cellIndividual-t-ReselectionEUTRA-SF    SpeedStateScaleFactors
}
-- ASN1STOP
```

As in Table 30, an exemplary embodiment of the present invention newly proposes a 'cellIndividualInfoList' field that is a part shown in a highlighted color in an SIB3. Within the 'cellIndividualInfoList' field, 'cellIndividualInfo' fields of 'N' number are set.

Within the 'cellIndividualInfo' field, a 'cellIndividual-t-ReselectionEUTRA' field that is a Treselection value independently every PCI range of a specific cell type is set.

The added 'cellIndividual-t-Reselection-SF' field means a cell individual Treselection-SF value applied to a specific neighboring cell. In the case of the specific neighboring cell, Table 30 can multiply an originally given Treselection value by the SF value and set a TTT short.

Here, Table 30 applies a SpeedStateScaleFactors IE that is an SF value set considering a speed state of a UE presented in the LTE standard of the related art as it is. Here, a phyCellIdRange and a cellIndividual-t-ReselectionEUTRA-SF are shown in Table 31 below.

TABLE 31

PhyCellIdRange
A range of physical cell identities in neighboring cell list.
cellIndividual-t-ReselectionEUTRA-SF
Cell individual parameter "Speed dependent Scaling Factor for TreselectionEUTRAN"

Table 32 relates to a method of newly setting, in consideration of an existing speed of a UE, a Treselection-SF value by a neighboring cell belonging to a specific cell type according to an exemplary embodiment of the present invention.

Table 31 relates to a method (2-4) for setting a Treselection-SF value independently by neighboring cells belonging to a specific cell type. Table 31 is irrespective of any SIB that an idle mode UE can receive but, as an exemplary embodiment, is set to an SIB3 currently including the Treselection-SF value. The example (2-4) can consider an example (2-4-2) for newly setting separate SF values considering an existing speed state of a UE.

TABLE 32

SystemInformationBlockType3 information element

```
-- ASN1START
SystemInformationBlockType3 ::= SEQUENCE {
    cellReselectionInfoCommon       SEQUENCE {
        q-Hyst                          ENUMERATED {
                                            dB0, dB1, dB2, dB3, dB4, dB5, dB6, dB8, dB10,
```

TABLE 32-continued

SystemInformationBlockType3 information element

```
                            dB12, dB14, dB16, dB18, dB20, dB22, dB24},
    speedStateReselectionPars   SEQUENCE {
       mobilityStateParameters    MobilityStateParameters,
       q-HystSF                   SEQUENCE {
          sf-Medium                  ENUMERATED {
                                        dB-6, dB-4, dB-2, dB0},
          sf-High                    ENUMERATED {
                                        dB-6, dB-4, dB-2, dB0}
       }
    }                                                OPTIONAL    -- Need OP
},
cellReselectionServingFreqInfo  SEQUENCE {
    s-NonIntraSearch              ReselectionThreshold   OPTIONAL,  -- Need OP
    threshServingLow              ReselectionThreshold,
    cellReselectionPriority       CellReselectionPriority
},
intraFreqCellReselectionInfo    SEQUENCE {
    q-RxLevMin                    Q-RxLevMin,
    p-Max                         P-Max                  OPTIONAL,  -- Need OP
    s-IntraSearch                 ReselectionThreshold   OPTIONAL,  -- Need OP
    allowedMeasBandwidth          AllowedMeasBandwidth   OPTIONAL,  -- Need OP
    presenceAntennaPort1          PresenceAntennaPort1,
    neighCellConfig               NeighCellConfig,
    t-ReselectionEUTRA            T-Reselection,
    cellIndividualInfoList        CellIndividualInfoList, OPTIONAL, -- Need OP
    t-ReselectionEUTRA-SF         SpeedStateScaleFactors  OPTIONAL  -- Need OP
    cellTypeList                  CellTypeList
},
...
}
CellIndividualInfoList ::=   SEQUENCE (SIZE (1..N)) OF CellIndividualInfo
CellIndividualInfo ::= SEQUENCE {
    physCellRange                 PhysCellRange,
    cellIndividual-t-ReselectionEUTRA-SF  CellIndividualScaleFactors
}
-- ASN1STOP
```

As in Table 32, an exemplary embodiment of the present invention newly proposes a 'cellIndividualInfoList' field that is a part shown in a highlighted color in an SIB3.

Within the 'cellIndividualInfoList' field, 'cellIndividual-Info' fields of 'N' number are set. Within the 'cellIndividual-Info' field, a 'cellIndividual-t-ReselectionEUTRA' field that is a Treselection value independently every PCI range of a specific cell type is set.

The added 'cellIndividual-t-Reselection-SF' field means a cell individual Treselection-SF value applied to a specific neighboring cell. In the case of the specific neighboring cell, Table 32 can multiply an originally given Treselection value by the SF value and set a TTT short.

Here, Table 32 applies 'SpeedStateScaleFactors' that include a newly defined scale factor related IE. Here, a phy-CellId and a cellIndividual-t-ReselectionEUTRA-SF are shown in Table 33 below.

TABLE 33 phyCellId
Physical cell identity of a cell in neighboring cell list.
cellIndividual-t-ReselectionEUTRA-SF
Cell individual parameter "Speed dependent Scaling Factor for TreselectionEUTRAN"

CellIndividualScaleFactors information element

```
-- ASN1START
CellIndividualScaleFactors ::= ENUMERATED {x_1, x_2, ..., x_n}
-- ASN1STOP
```

Here, 'x_1', 'x_2', . . . , 'x_n' values are mapped to values of 0 to 1.

Figure 11:
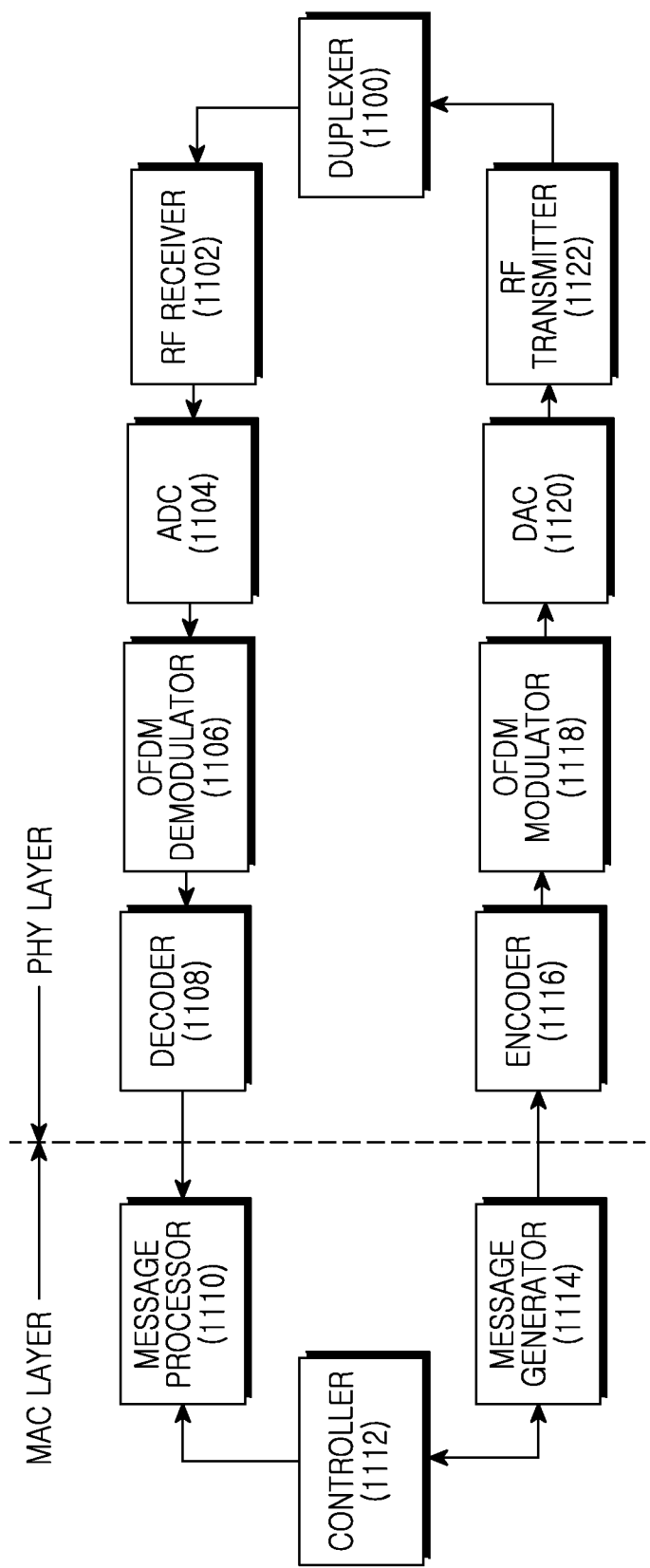
FIG. 11 is a block diagram illustrating a construction of an eNB or a UE according to an exemplary embodiment of the present invention.

FIG. 11 is a block diagram illustrating a construction of an eNB or a UE according to an exemplary embodiment of the present invention.

Referring to FIG. 11, the eNB (or the UE) includes a duplexer 1100, a Radio Frequency (RF) receiver 1102, an Analog to Digital Converter (ADC) 1104, an Orthogonal Frequency Division Multiplexing (OFDM) demodulator 1106, a decoder 1108, a message processor 1110, a controller 1112, a message generator 1114, an encoder 1116, an OFDM modulator 1118, a Digital to Analog Converter (DAC) 1120, and an RF transmitter 1122.

According to a duplexing scheme, the duplexer 1100 forwards, to the RF receiver 1102, a received signal from an antenna, and transmits a transmit signal from the RF transmitter 1122 through the antenna.

The RF receiver 1102 converts an RF signal from the duplexer 1100 into a baseband analog signal. The ADC 1104 converts the analog signal from the RF receiver 1102 into sample data. The OFDM demodulator 1106 processes, by Fast Fourier Transform (FFT), the sample data output from the ADC 1104, and outputs frequency domain data.

The decoder 1108 selects data (i.e., burst data) of subcarriers, which is intended for reception, among the frequency domain data from the OFDM demodulator 1106, and processes, by demodulation and decoding, the selected data according to a predefined modulation level (i.e., a Modulation and Coding Scheme (MCS) level).

The message processor 1110 detects a packet (e.g., a Media Access Control Protocol Data Unit (MAC PDU)) of a predetermined unit in the data from the decoder 1108, and performs a header and error check for the detected packet. At this time, if it is determined to be a control message through the header check, the message processor 1110 interprets the control message according to a defined standard, and provides the result to the controller 1112. That is, the message processor 1110 extracts various kinds of control information from the received control message and forwards the extracted control information to the controller 1112.

The controller 1112 performs corresponding processing based on the information from the message processor 1110. Also, when there is a need to transmit a control message, the controller 1112 generates corresponding information and provides the generated information to the message generator 1114. The message generator 1114 generates a message by means of various kinds of the information provided from the controller 1112 and outputs the generated message to the encoder 1116 of a physical layer.

The encoder 1116 encodes and modulates data from the message generator 1114, according to a predefined modulation level (i.e., an MCS level). The OFDM modulator 1118 processes, by Inverse Fast Fourier Transform (IFFT), the data from the encoder 1116 and outputs sample data (i.e., OFDM symbols). The DAC 1120 converts the sample data into an analog signal. The RF transmitter 1122 converts the analog signal from the DAC 1120 into an RF signal and transmits the RF signal through the antenna.

In the aforementioned construction, the controller 1112, a protocol controller, controls the message processor 1110 and the message generator 1114. That is, the controller 1112 can perform functions of the message processor 1110 and the message generator 1114. These are separately constructed and shown in order to distinguish and describe respective functions in an exemplary embodiment of the present invention. Thus, in an actual realization, construction can be such that all the functions are processed in the controller 1112, or construction can be such that only part of the functions is processed in the controller 1112.

Next, operations of the eNB and the UE are described, respectively, based on the construction of FIG. 11.

Regarding a description of the eNB, the controller 1112 generates its own TTT and handover trigger threshold values independently by a neighboring eNB or reads out the TTT and handover trigger threshold values from a storage unit (not shown), and provides the TTT and handover trigger threshold values to the message generator 1114. The message generator 1114 generates a corresponding message and outputs the generated message to the encoder 1116. The controller 1112 performs corresponding processing when receiving a control message (i.e., an IE) of an exemplary embodiment of the present invention from the message processor 1110.

Or, the controller 1112 generates information such as a TTT, a TTT-SF, a Treselection, a Treselection-SF and the like that are information of an exemplary embodiment of the present invention to be transmitted to a UE or reads out the information from the storage unit (not shown), and provides the information to the message generator 1114. The message generator 1114 generates a corresponding message and outputs the message to the encoder 1116.

Regarding a description of the UE, when receiving information such as a TTT, a TTT-SF, a Treselection, a Treselection-SF and the like from the message processor 1110, the controller 1112 enables operation by applying the information when the UE performs handover or cell reselection.

Henceforth, an analysis of the performance of an exemplary embodiment of the present invention is described below. A hot zone cell described herein is the same as a micro cell.

Figure 12:
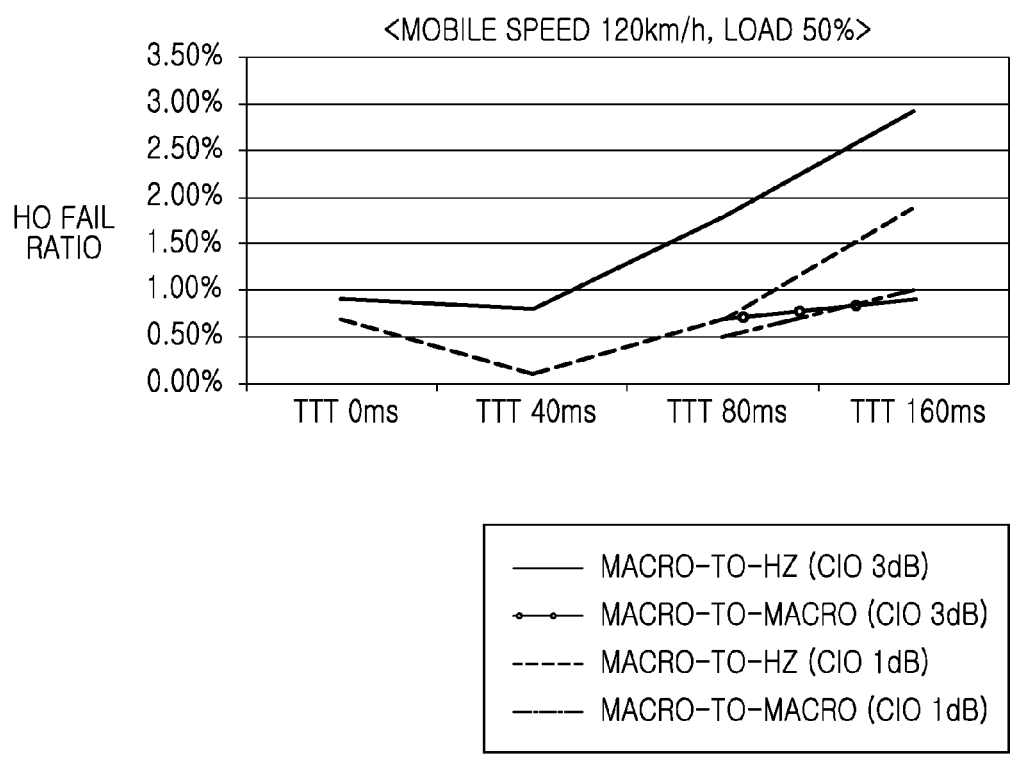
FIG. 12 is a graph illustrating an HO fail ratio result when a load factor is 50% and an UpLink (UL) Interoperability Test (IoT) is 5 dB according to an exemplary embodiment of the present invention.
Figure 13:
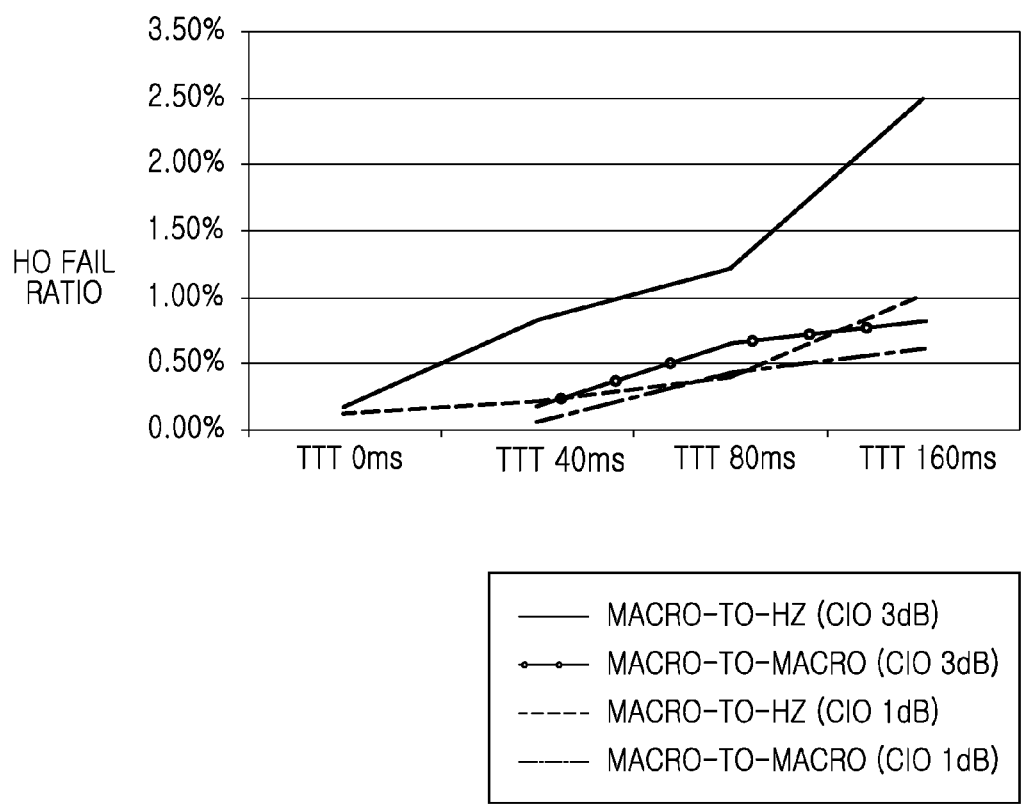
FIG. 13 is a graph illustrating an HO fail ratio result when the load factor is 100% and the UL Interoperability Test (IoT) is 7 dB according to an exemplary embodiment of the present invention.

FIG. 12 is a graph illustrating the result of an HO fail ratio when a load factor is 50% and a UL Interoperability Test (IoT) is 5 dB according to an exemplary embodiment of the present invention, and FIG. 13 is a graph illustrating the result of an HO fail ratio when the load factor is 100% and the UL IoT is 7 dB according to an exemplary embodiment of the present invention.

Referring to FIG. 12, an HO fail ratio acceptable on system management definition is equal to 2%, so it can be appreciated from the above performance graph that the optimum set parameters are TTT=80 to 160 ms and Cell Individual Offset (CIO)=1 to 3 dB in a DL 50% load environment from a macro cell to a macro cell, while the optimum set parameters are TTT=0 to 80 ms and CIO=1 to 3 dB in an environment from a macro cell to a micro cell.

Referring to FIG. 13, it can also be appreciated that the optimum set parameters are TTT=40 ms and CIO=1 dB in a 100% load environment from a macro cell to a macro cell, while the optimum set parameters are TTT=0 ms and CIO=1 dB to 3 dB in an environment from a macro cell to a micro cell.

As described above, exemplary embodiments of the present invention have an advantage of being capable of improving an HO performance success ratio between a macro cell and a micro cell because negotiating TTT related information between macro and micro eNBs supports a stable HO success when a UE performs handover between the macro cell and the micro cell.

Also, the exemplary embodiments of the present invention have an advantage in that a serving eNB can forward a TTT value independently by a specific neighboring eNB to an active mode UE for the sake of performing stable handover between a macro cell and a micro cell in an LTE system.

Also, the exemplary embodiments of the present invention propose a way for an eNB to forward a Treselection value independently by a neighboring cell belonging to a specific cell type, to an idle mode UE for the sake of stable cell reselection performance between a macro cell and a micro cell in an LTE system, thereby advantageously improving an HO performance success ratio between the macro cell and the micro cell.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a serving Base Station (BS) to provide information necessary for measurement report trigger performance to a Mobile Station (MS) after the MS determines neighboring BSs in a mobile communication system, the method comprising:

in a case where the MS is an active mode MS, providing, by the serving BS, a Time To Trigger (TTT) independently for a specific neighboring BS to the active mode MS; and in a case where the MS is an idle mode MS, providing, by the serving BS, a reselection time period (Treselection) independently for a specific neighboring BS to the idle mode MS.

2. The method of claim 1, wherein the providing of the independent TTT to the active mode MS comprises including the TTT in a MeasObjectEUTRA Information Element (IE) and providing the MeasObjectEUTRA Information Element (IE) to the active mode MS, and wherein the providing of the independent Treselection to the idle mode MS comprises including the Treselection in a System Information Block (SIB) and providing the SIB to the idle mode MS.

3. The method of claim 1, further comprising:
in the case where the MS is the active mode MS, providing, by the serving BS, a TTT-Scaling Factor (SF) independently for the specific neighboring BS to the active mode MS; and
in the case where the MS is the idle mode MS, providing, by the serving BS, a Treselection-SF independently for the specific neighboring BS to the idle mode MS.

4. The method of claim 3, wherein the providing of the independent TTT-SF to the active mode MS comprises including, in a MeasObjectEUTRA Information Element (IE), a TTT-SF applying an SF value set considering a speed of the MS and providing the MeasObjectEUTRA IE to the active mode MS, or including, in the MeasObjectEUTRA IE, a TTT-SF newly setting a separate SF value and providing the MeasObjectEUTRA IE to the active mode MS, and
wherein the providing of the independent Treselection-SF to the idle mode MS comprises including, in a System Information Block (SIB), a Treselection-SF applying an SF value set considering the speed of the MS and providing the SIB to the idle mode MS, or including, in the SIB, a Treselection-SF newly setting a separate SF value and providing the SIB to the idle mode MS.

5. The method of claim 1, further comprising:
in the case where the MS is the active mode MS, providing, by the serving BS, the TTT independently for the neighboring BS belonging to a specific cell type to the active mode MS; and
in the case where the MS is the idle mode MS, providing, by the serving BS, a Treselection independently for the neighboring BS belonging to the specific cell type to the idle mode MS.

6. The method of claim 5, wherein the providing of the TTT independently for the neighboring BS belonging to the specific cell type to the active mode MS comprises setting, to a MeasObjectEUTRA Information Element (IE), the TTT independently for the neighboring BS belonging to the specific cell type and providing the MeasObjectEUTRA IE to the active mode MS, or setting, to a ReportConfigEUTRA IE, the TTT independently for the neighboring BS belonging to the specific cell type and providing the ReportConfigEUTRA IE to the active mode MS, and
wherein the providing of the Treselection independently for the neighboring BS belonging to the specific cell type to the idle mode MS comprises including, in a System Information Block (SIB), the Treselection independently for the neighboring BS belonging to the specific cell type and providing the SIB to the idle mode MS.

7. The method of claim 1, further comprising:
in the case where the MS is the active mode MS, providing, by the serving BS, a TTT-Scaling Factor (SF) independently for the neighboring BS belonging to a specific cell type to the active mode MS; and
in the case where the MS is the idle mode MS, providing, by the serving BS, a Treselection-SF independently for the neighboring BS belonging to the specific cell type to the idle mode MS.

8. The method of claim 7, wherein the providing of the TTT-SF independently for the neighboring BS belonging to the specific cell type to the active mode MS comprises including, in a MeasObjectEUTRA Information Element (IE) or ReportConfigEUTRA IE, a TTT-SF applying an SF value set considering a speed of the MS and providing the MeasObjectEUTRA IE or ReportConfigEUTRA IE to the active mode MS, or including, in the MeasObjectEUTRA IE or ReportConfigEUTRA IE, a TTT-SF newly setting a separate SF value and providing the MeasObjectEUTRA IE or ReportConfigEUTRA IE to the active mode MS, and
wherein the providing of the Treselection-SF independently for the neighboring BS belonging to the specific cell type to the idle mode MS comprises including, in a System Information Block (SIB), a Treselection-SF applying an SF value set considering the speed of the MS and providing the SIB to the idle mode MS, or including, in the SIB, a Treselection-SF newly setting a separate SF value and providing the SIB to the idle mode MS.

9. An apparatus of a serving Base Station (BS) providing information of a neighboring BS to a Mobile Station (MS) in a mobile communication system, the apparatus comprising:
a controller for, in a case where the MS is an active mode MS, generating a Time To Trigger (TTT) independently for a specific neighboring BS and, in a case where the MS is an idle mode MS, generating a Treselection independently for the specific neighboring BS; and
a transmitter for transmitting the generated TTT to the active mode MS and for transmitting the generated Treselection to the idle mode MS.

10. The apparatus of claim 9, wherein the controller includes the TTT in a MeasObjectEUTRA Information Element (IE) and provides the MeasObjectEUTRA IE to the active mode MS, thereby providing the independent TTT to the active mode MS, and
wherein the controller includes the Treselection in a System Information Block (SIB) and provides the SIB to the idle mode MS, thereby providing the independent Treselection to the idle mode MS.

11. The apparatus of claim 9, wherein, in the case where the MS is the active mode MS, the controller provides a TTT-Scaling Factor (SF) independently for a specific neighboring BS to the active mode MS, and
in the case where the MS is the idle mode MS, the controller provides a Treselection-SF independently for the specific neighboring BS to the idle mode MS.

12. The apparatus of claim 9, wherein the controller includes, in a MeasObjectEUTRA Information Element (IE), a TTT-Scaling Factor (SF) applying an SF value set considering a speed of the MS and provides the MeasObjectEUTRA IE to the active mode MS, or includes, in the MeasObjectEUTRA IE, a TTT-SF newly setting a separate SF value and provides the MeasObjectEUTRA IE to the active mode MS, thereby providing the independent TTT-SF to the active mode MS, and
wherein the controller includes, in a System Information Block (SIB), a Treselection-SF applying an SF value set considering the speed of the MS and provides the SIB to the idle mode MS, or comprises, in the SIB, a Treselection-SF newly setting a separate SF value and provides the SIB to the idle mode MS, thereby providing the independent Treselection-SF to the idle mode MS.

13. The apparatus of claim 9, wherein, in the case where the MS is the active mode MS, the controller provides a TTT independently for the neighboring BS belonging to a specific cell type to the active mode MS, and
in the case where the MS is the idle mode MS, the controller provides a Treselection independently for the neighboring BS belonging to the specific cell type to the idle mode MS.

14. The apparatus of claim 13, wherein the controller sets, to a MeasObjectEUTRA Information Element (IE), the TTT independently for the neighboring BS belonging to the specific cell type and provides the MeasObjectEUTRA IE to the active mode MS, or sets, to a ReportConfigEUTRA IE, the TTT independently for the neighboring BS belonging to the specific cell type and provides the ReportConfigEUTRA IE to the active mode MS, thereby providing the TTT independently for the neighboring BS belonging to the specific cell type to the active mode MS, and wherein the controller includes, in a System Information Block (SIB), the Treselection independently for the neighboring BS belonging to the specific cell type and provides the SIB to the idle mode MS, thereby providing the Treselection independently for the neighboring BS belonging to the specific cell type to the idle mode MS.

15. The apparatus of claim 9, wherein, in the case where the MS is the active mode MS, the controller provides a TTT-Scaling Factor (SF) independently for the neighboring BS belonging to a specific cell type to the active mode MS, and in the case where the MS is the idle mode MS, the controller provides a Treselection-SF independently for the neighboring BS belonging to the specific cell type to the idle mode MS.

16. The apparatus of claim 15, wherein the controller includes, in a MeasObjectEUTRA Information Element (IE) or ReportConfigEUTRA IE, a TTT-SF applying an SF value set considering a speed of the MS and provides the MeasObjectEUTRA IE or ReportConfigEUTRA IE to the active mode MS, or includes, in the MeasObjectEUTRA IE or ReportConfigEUTRA IE, a TTT-SF newly setting a separate SF value and provides the MeasObjectEUTRA IE or ReportConfigEUTRA IE to the active mode MS, thereby providing the TTT-SF independently for the neighboring BS belonging to the specific cell type to the active mode MS, and wherein the controller includes, in a System Information Block (SIB), a Treselection-SF applying an SF value set considering the speed of the MS and provides the SIB to the idle mode MS, or includes, in the SIB, a Treselection-SF newly setting a separate SF value and provides the SIB to the idle mode MS, thereby providing the Treselection-SF independently for the neighboring BS belonging to the specific cell type to the idle mode MS.

* * * * *